(12) United States Patent
Karaki et al.

(10) Patent No.: US 9,513,030 B2
(45) Date of Patent: Dec. 6, 2016

(54) WATER HEATER

(71) Applicant: NORITZ CORPORATION, Hyogo (JP)

(72) Inventors: Tatsuya Karaki, Kako-gun (JP); Yasutaka Kuriyama, Kakogawa (JP); Norihide Wada, Akashi (JP); Shuji Kameyama, Himeji (JP); Keigo Fukunishi, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 84 days.

(21) Appl. No.: 14/560,085

(22) Filed: Dec. 4, 2014

(65) Prior Publication Data
US 2015/0176861 A1    Jun. 25, 2015

(30) Foreign Application Priority Data

Dec. 25, 2013 (JP) ................................. 2013-267353
Apr. 15, 2014 (JP) ................................. 2014-083578

(51) Int. Cl.
*F24H 8/00* (2006.01)
*F23L 17/00* (2006.01)
(Continued)

(52) U.S. Cl.
CPC ................. *F24H 8/006* (2013.01); *F23J 1/00* (2013.01); *F23L 17/005* (2013.01); *F24H 1/43* (2013.01); *F24H 9/0026* (2013.01); *Y02B 30/106* (2013.01)

(58) Field of Classification Search
CPC ....................................................... F24H 8/00
USPC ................................... 122/13.3, 15.1, 18.1
See application file for complete search history.

(56) References Cited

U.S. PATENT DOCUMENTS 4,444,156 A * 4/1984 Iwasaki ................... F24H 1/145
                                                    110/203
4,651,680 A * 3/1987 Couprie ................... F23L 15/04
                                                    122/159

(Continued)

FOREIGN PATENT DOCUMENTS

JP    57-112635 A    7/1982
JP    58-069742 U    5/1983

(Continued)

OTHER PUBLICATIONS

An Office Action issued by the Japanese Patent Office on Oct. 27, 2015, which corresponds to Japanese Patent Application No. 2013-267353 and is related to U.S. Appl. No. 14/560,085; with English language partial translation.

(Continued)

*Primary Examiner* — Gregory A Wilson
(74) *Attorney, Agent, or Firm* — Studebaker & Brackett PC

(57) ABSTRACT

A water heater of a latent heat recovery type includes: a combustion apparatus including a burner having a plurality of burner port portions and generating combustion gas from openings at ends of the plurality of burner port portions; a heat exchanger heating water that flows through inside by heat exchange with combustion gas generated in the combustion apparatus; and a fan suctioning the combustion gas that has passed through the heat exchanger and emitting combustion gas to outside of the water heater. The fan includes a fan case, an impeller housed within the fan case, and a drive source connected to the impeller. At least a part of an upper surface of a bottom wall of the fan case is inclined with respect to a reference plane including the openings of the plurality of burner port portions.

18 Claims, 17 Drawing Sheets

(51) Int. Cl.
*F24H 1/43* (2006.01)
*F24H 9/00* (2006.01)
*F23J 1/00* (2006.01)

(56) References Cited

U.S. PATENT DOCUMENTS

| | | | | |
|---|---|---|---|---|
| 4,863,567 A | * | 9/1989 | Raley | B01D 1/0017 165/88 |
| 5,538,395 A | | 7/1996 | Hager | |
| 6,415,744 B1 | * | 7/2002 | Choi | F23L 17/00 122/15.1 |
| 2007/0277955 A1 | * | 12/2007 | Kaiser | F24H 3/06 165/45 |
| 2009/0133642 A1 | * | 5/2009 | Asakura | F22D 1/10 122/32 |
| 2011/0061832 A1 | * | 3/2011 | Albertson | F24D 5/04 165/45 |
| 2011/0155079 A1 | * | 6/2011 | Matsunaga | F24H 1/40 122/15.1 |
| 2013/0199460 A1 | * | 8/2013 | Duplessis | B21D 53/02 122/13.01 |

FOREIGN PATENT DOCUMENTS

| | | |
|---|---|---|
| JP | S60-186617 A | 9/1985 |
| JP | 60-160348 U | 10/1985 |
| JP | 2009-250469 A | 10/2009 |
| WO | 2006/046330 A1 | 5/2006 |

OTHER PUBLICATIONS

An Office Action issued by the Japanese Patent Office on Oct. 27, 2015, which corresponds to Japanese Patent Application No. 2014-083578 and is related to U.S. Appl. No. 14/560,085; with English language partial translation.

* cited by examiner

WATER HEATER

BACKGROUND OF THE INVENTION

Field of the Invention

The present invention relates to a water heater and particularly to a water heater of a latent heat recovery type capable of heating water by recovering latent heat of combustion gas.

Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion system should be adopted for a water heater.

A water heater adapted to this exhaust suction and combustion system is disclosed, for example, in Japanese Patent Laying-Open No. 60-186617. In the water heater described in this publication, a heat exchanger for recovering sensible heat, a heat exchanger for recovering latent heat, and a fan are arranged in this order on a downstream side in a flow of combustion gas produced in a burner. Namely, in the water heater of this type, the fan is arranged downstream of the heat exchanger for recovering latent heat in the flow of combustion gas.

In the water heater of a latent heat recovery type, acid drainage water is generated by heat exchange. When this drainage water remains in the fan or an exhaust portion and condenses therein, the material of the exhaust portion may be damaged thereby, which leads to leakage of the exhaust gas.

According to the conventional water heater of what is called a forced exhaust type, only an exhaust box and an exhaust tube are provided downstream of the secondary heat exchanger in the flow of combustion gas. Thus, the drainage water having returned from the exhaust tube and the drainage water adhering to the exhaust box fall off into the secondary heat exchanger, and then, are collectively discharged to the outside through a drainage water discharge port provided in the secondary heat exchanger.

However, in the water heater adapted to an exhaust suction and combustion system, an exhaust box, a fan case, and the like are interposed between the secondary heat exchanger and the exhaust tube. Accordingly, if the drainage water returning from the exhaust tube merely falls off, it does not return to the secondary heat exchanger. Furthermore, in the water heater adapted to the exhaust suction and combustion system as described above, a fan is disposed downstream of the heat exchanger for recovering latent heat, so that drainage water is also to come into the fan case. In addition, all of the drainage water adhering to the inside of the fan case does not fall off into the secondary heat exchanger, but most of the drainage water is to remain within the fan case.

SUMMARY OF THE INVENTION

The present invention has been made in light of the above-described problems. An object of the present invention is to provide a water heater of a latent heat recovery type adapted to an exhaust suction and combustion system, which has an exhaust path that is more complicated than that in the conventional case, for the purpose of suppressing corrosion of a fan resulting from accumulation and condensation of drainage water within a fan case.

A water heater according to the present invention is a water heater of a latent heat recovery type capable of heating water by recovering latent heat of combustion gas, and includes a combustion apparatus, a heat exchanger, and a fan.

The combustion apparatus includes a burner having a plurality of burner port portions and serves to generate combustion gas from openings at ends of the plurality of burner port portions. The heat exchanger serves to heat water flowing through inside by heat exchange with combustion gas generated in the combustion apparatus. The fan serves to suction combustion gas having passed through the heat exchanger and emit combustion gas to outside of the water heater, and includes a fan case, an impeller housed within the fan case so as to be rotatable, and a drive source provided outside the fan case and having a rotation shaft connected to the impeller.

At least a part of an upper surface of a bottom wall of the fan case is inclined with respect to a reference plane including the openings of the plurality of burner port portions. This allows the drainage water to be readily moved by gravity within the fan case, so that the drainage water is less likely to stay within the fan case.

In the first embodiment of the water heater of the present invention, the fan includes an inlet port through which combustion gas is suctioned. The inlet port is provided at a position in the bottom wall of the fan case that is closest to the heat exchanger in a direction perpendicular to the reference plane including the openings of the plurality of burner port portions. Furthermore, at least a part of the upper surface of the bottom wall has an inclined portion that is inclined with respect to the reference plane so as to be closer to the heat exchanger as coming closer to the inlet port. This allows the drainage water to be readily moved by gravity on the upper surface of the bottom wall of the fan case and dripped from the inlet port, so that the drainage water is less likely to stay within the fan case.

In the water heater described above, it is preferable that at least a portion of the upper surface of the bottom wall of the fan case that overlaps with the impeller as seen from a shaft direction of the rotation shaft entirely has an inclined portion that is inclined with respect to the reference plane so as to be closer to the heat exchanger as coming closer to the inlet port. This allows the drainage water to be readily moved by gravity more smoothly on the upper surface of the bottom wall of the fan case and dripped from the inlet port, so that the drainage water is further less likely to stay within the fan case.

In the water heater described above, it is preferable that a shaft direction of the rotation shaft is perpendicular to the reference plane. Accordingly, for example, as compared with the case where the shaft direction of the rotation shaft is inclined with respect to the reference plane, the entire fan is reduced in dimension in the direction perpendicular to the reference plane (in the height direction), thereby allowing space saving for the fan, so that the entire water heater can also be decreased in size. Furthermore, for example, as compared with the case where the shaft direction of the rotation shaft is inclined with respect to the reference plane, the drainage water within the fan case is less likely to come into the drive source through a base portion of the rotation shaft, so that failures and the like of the drive source can be suppressed. Furthermore, there is also an advantage that the space used for performing an operation to attach and detach a fan during maintenance can be reduced.

It is preferable that the water heater described above further includes an exhaust box between the fan and the heat exchanger for introducing combustion gas from the heat exchanger into the fan; the heat exchanger has an upper wall that is partially opened to form a combustion gas exhaust port; and a flow path cross-sectional area in a cross section of the exhaust box that is parallel to the reference plane is larger than an opening area of the combustion gas exhaust port and an opening area of the inlet port. Thereby, the flow velocity of combustion gas suctioned by the fan is once lowered within the exhaust box. Accordingly, even if the drainage water within the heat exchanger is stirred up together with combustion gas, the drainage water within the heat exchanger can be suppressed from being suctioned into the fan.

In the water heater described above, it is preferable that the exhaust box further includes a deflection plate between the combustion gas exhaust port of the heat exchanger and the inlet port of the fan case so as to be spaced apart from the combustion gas exhaust port and the inlet port; and the deflection plate blocks a portion where at least the inlet port and the combustion gas exhaust port overlap with each other as seen from a direction of the rotation shaft. Thereby, the upward flow of combustion gas that is suctioned by the fan is deflected once in the lateral direction by the deflection plate. Accordingly, even if the drainage water within the heat exchanger is stirred up together with combustion gas, it stays below the deflection plate within the exhaust box. Consequently, the drainage water within the heat exchanger can be more reliably prevented from being suctioned into the fan.

In the water heater described above, it is preferable that the fan case has a first cylindrical portion formed of a circumferential wall protruding from a circumferential edge portion of the inlet port of the bottom wall toward the heat exchanger; the exhaust box has a ceiling wall having an opening and a second cylindrical portion formed of a circumferential wall protruding from a circumferential edge portion of the opening of the ceiling wall toward the fan case; the first cylindrical portion is fitted into the second cylindrical portion; and a seal member is interposed between an outer circumferential surface of the first cylindrical portion and an inner circumferential surface of the second cylindrical portion. Accordingly, a distance corresponding to each height of the first cylindrical portion and the second cylindrical portion is ensured between the inlet port of the fan case and the combustion gas exhaust port of the heat exchanger. Thereby, the drainage water within the heat exchanger can be suppressed from being stirred up by the fan together with combustion gas, so that the drainage water is less likely to stay within the fan case. Furthermore, the first cylindrical portion is fitted into the second cylindrical portion. Accordingly, when the drainage water drips from the inlet port of the fan case, the drainage water can be prevented from leaking to the outside of the path through a gap in a joint portion between the first cylindrical portion and the second cylindrical portion. Furthermore, leakage of the drainage water is more reliably prevented by the seal member. Thereby, it becomes possible to prevent harmful effects such as a decrease in heat exchange efficiency that is caused by the decreased proportion of combustion gas resulting from suctioning of air outside the exhaust path.

In the water heater described above, it is preferable that at least a part of the inlet port of the fan case does not overlap with the combustion gas exhaust port of the heat exchanger as seen from a direction of the rotation shaft. Accordingly, as compared with the case where the entire inlet port of the fan case overlaps with the combustion gas exhaust port of the heat exchanger, the drainage water within the heat exchanger can be suppressed from being stirred up by the fan together with combustion gas, so that the drainage water is less likely to stay within the fan case.

In the water heater described above, it is preferable that the impeller is made of a resin material having acid resistance. Thereby, deterioration of the fan caused by drainage water is suppressed.

In the water heater described above, it is preferable that the reference plane is a horizontal plane in a state where the water heater is placed. In this case, the inlet port is located in the lowest portion of the bottom wall of the fan case (at the lowermost position in the vertical direction) in the state where the water heater is placed. This allows the drainage water to be readily dripped by gravity from the inlet port, so that the drainage water is less likely to stay within the fan case.

In the second embodiment of the water heater of the present invention, it is preferable that at least a portion in the upper surface of the bottom wall of the fan case that is located on an outer circumferential side relative to the impeller is inclined with respect to the reference plane. In this case, even in the state where the impeller within the fan case is rotating, drainage water can be moved by gravity on the bottom wall of the outer circumferential portion of the fan case, so that the drainage water is less likely to stay within the fan case.

In the water heater described above, it is preferable that the rotation shaft is inclined with respect to a direction perpendicular to the reference plane. In this case, the impeller within the fan case is also inclined, thereby allowing the drainage water adhering to the impeller to be readily moved by gravity, so that the drainage water is further less likely to stay within the fan case. Furthermore, corrosion and the like of the impeller caused by drainage water can be suppressed.

In the water heater described above, it is preferable that the bottom wall of the fan case is provided with a drainage water discharge port at least at a lowermost position in a vertical direction in a state where the water heater is placed. In this case, since the drainage water having moved by gravity to the lowermost position in the vertical direction on the bottom wall of the fan case is discharged through the drainage water discharge port to the outside of the fan case, the drainage water is less likely to stay within the fan case.

It is preferable that the above-described water heater further includes an exhaust box between the fan and the heat exchanger for introducing combustion gas from the heat exchanger into the fan; an upper wall of the exhaust box is inclined with respect to the reference plane; and the fan is fixed to the upper wall of the exhaust box such that the rotation shaft is inclined with respect to the reference plane. In this case, the impeller within the fan case is also inclined, thereby allowing the drainage water adhering to the impeller to be readily moved by gravity, so that the drainage water is further less likely to stay within the fan case. Also, corrosion and the like of the impeller caused by drainage water can be suppressed.

In the water heater described above, it is preferable that the fan case is formed of a fan case main body including the bottom wall and a circumferential wall of the fan case, and a fan case lid including an upper wall of the fan case; and a seal member is disposed at a joint portion between the fan case main body and the fan case lid. In this case, there is an advantage that the seal member can prevent the drainage water within the fan case from oozing to the outside.

In the water heater described above, it is preferable that the water heater includes an exhaust joint for connecting the fan case and an exhaust tube leading to the outside of the water heater; and the exhaust joint has an opening in a portion connected to the exhaust tube, and this opening is located so as not to overlap with the impeller as seen from a direction perpendicular to the reference plane. Accordingly, even when drainage water and moisture drip from the exhaust tube onto the fan side, such drainage water and moisture are prevented from directly dripping onto the impeller of the fan, thereby allowing the drainage water to be moved by gravity without being stirred up by the impeller, so that the drainage water is less likely to stay within the fan case. Also, deterioration of the fan caused by the drainage water is suppressed.

In the water heater described above, it is preferable that the fan case is formed of a fan case main body including the bottom wall and a circumferential wall of the fan case, and a fan case lid including an upper wall of the fan case; and the water heater includes an exhaust box between the fan and the heat exchanger for introducing combustion gas from the heat exchanger into the fan, and an exhaust joint for connecting the fan case and an exhaust tube leading to the outside of the water heater; and at least the fan case main body, the exhaust box, and the exhaust joint are formed of an integrated structure. This eliminates the need to perform an operation to assemble components, so that a water heater can be readily manufactured.

In the water heater described above, it is preferable that the integrated structure includes a drainage water collection chamber collecting drainage water and moisture that have flowed backward from the exhaust tube; and a bottom wall of the drainage water collection chamber is inclined with respect to the reference plane, and has a drainage water discharge port leading to the exhaust box and located at a lowermost position in a vertical direction in a state where the water heater is placed. Accordingly, even when drainage water and moisture drip from the exhaust tube onto the fan side, such drainage water and moisture can be prevented from moving into the fan case, so that deterioration of the impeller caused by the drainage water is suppressed. Furthermore, drainage water and moisture are moved by gravity without being stirred up by the impeller and flow through the drainage water discharge port into the exhaust box, with the result that the drainage water is less likely to stay within the fan case.

In the water heater described above, it is preferable that the impeller is made of a resin material having acid resistance. Accordingly, deterioration of the fan caused by the drainage water is suppressed.

In the water heater described above, it is preferable that the reference plane is a horizontal plane in a state where the water heater is placed. In this case, in the state where the water heater is placed, the upper surface of the bottom wall of the fan case is inclined with respect to the horizontal direction and the rotation shaft of the fan is inclined with respect to the vertical direction (the fan is inclined with respect to the horizontal direction). This allows the drainage water to be readily moved by gravity, so that the drainage water is less likely to stay within the fan case.

According to the present invention as described above, also in the water heater of a latent heat recovery type adapted to an exhaust suction and combustion system, which has an exhaust path that is more complicated than that in the conventional case, it becomes possible to suppress corrosion of a fan resulting from accumulation and condensation of drainage water within the fan case.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
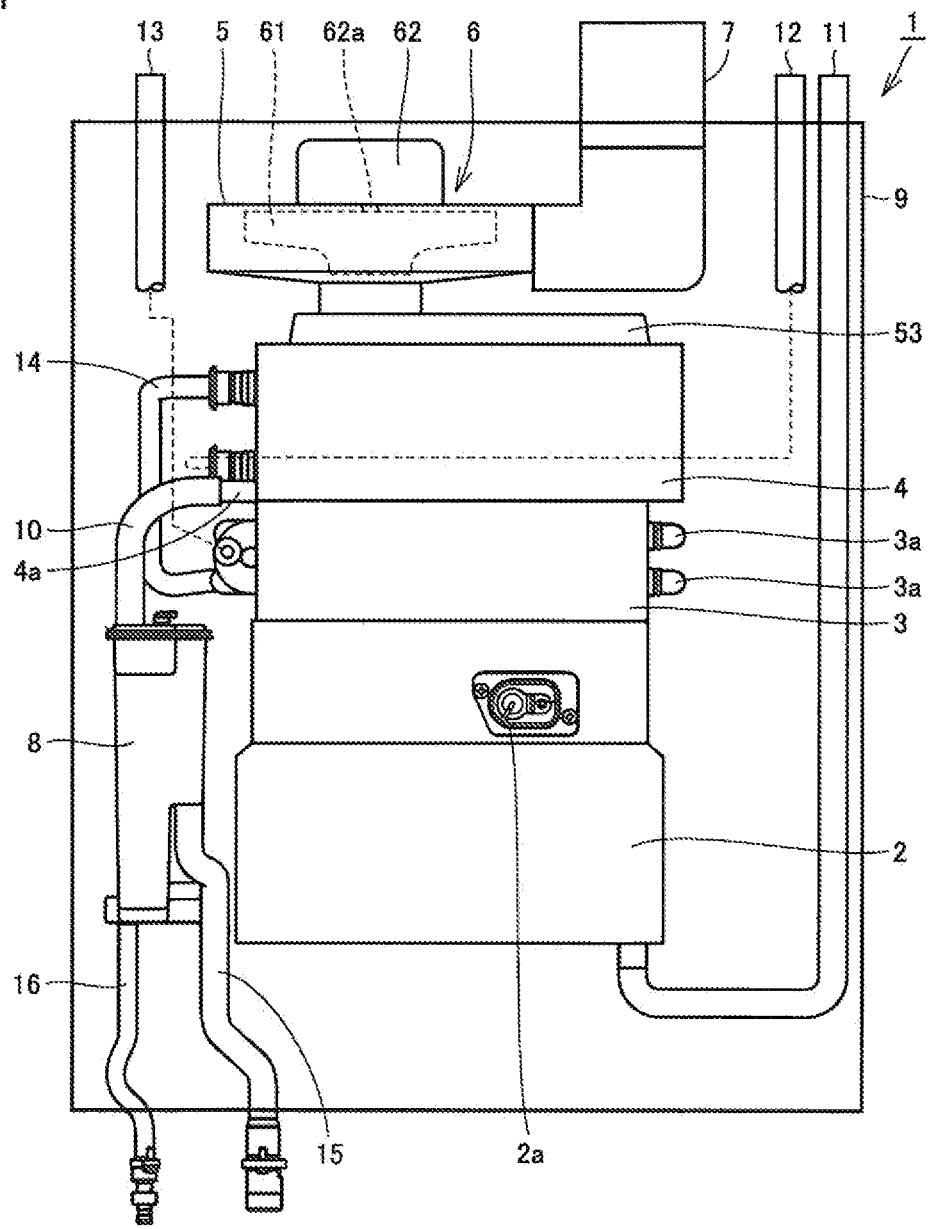
FIG. 1 is a front view schematically showing the configuration of a water heater in the first embodiment.

Embodiments of the present invention will be hereinafter described with reference to the drawings. In the accompanying drawings, the same or corresponding components are designated by the same reference characters. Furthermore, the dimensional relationship such as length, width, thickness, and depth is modified as appropriate for the purpose of clarifying and simplifying each figure, and is not to actual scale.

First Embodiment

The configuration of a water heater in the first embodiment will be hereinafter described with reference to FIGS. 1 to 4, 6 to 9 and 16 to 18.

Figure 2:
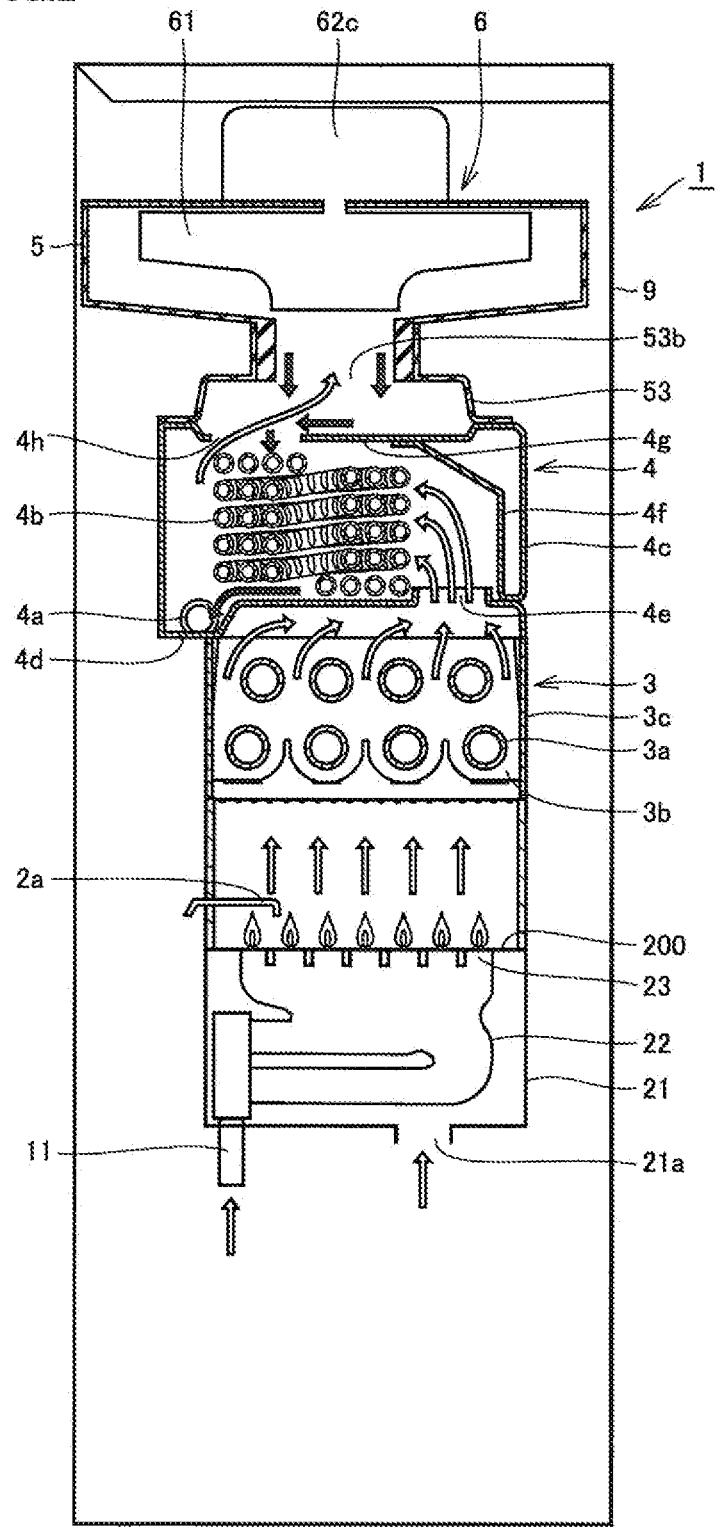
FIG. 2 is a partial cross-sectional side view schematically showing the configuration of the water heater shown in FIG. 1.

Referring mainly to FIGS. 1 and 2, a water heater 1 in the present embodiment is a water heater of a latent heat recovery type adapted to an exhaust suction and combustion system. This water heater 1 mainly has a combustion apparatus 2, a primary heat exchanger 3, a secondary heat exchanger 4, an exhaust box 53, a fan 6, an exhaust tube 7, a drainage water tank 8, a housing 9, and pipes 10 to 16.

(Combustion Apparatus)

Referring to FIGS. 1 and 2, combustion apparatus 2 serves to produce combustion gas by burning a fuel gas, and includes a burner 22 having a plurality of burner port portions 24. A gas supply pipe 11 is connected to burner 22. This gas supply pipe 11 serves to supply a fuel gas to burner 22. A gas valve (not shown) implemented, for example, by an electromagnetic valve is attached to this gas supply pipe 11. Furthermore, burner 22 is also supplied with air from an opening 21a at the bottom of a burner case 21 that houses the burner.

A spark plug 2a is arranged above burner 22. This spark plug 2a serves to ignite an air fuel mixture injected from burner port portions 24 of burner 22 to thereby produce a flame, by generating sparks between the plug and a target (not shown) provided in burner 22. Burner 22 generates a quantity of heat by burning a fuel gas supplied from gas supply pipe 11 (which is called a combustion operation).

Figure 16:
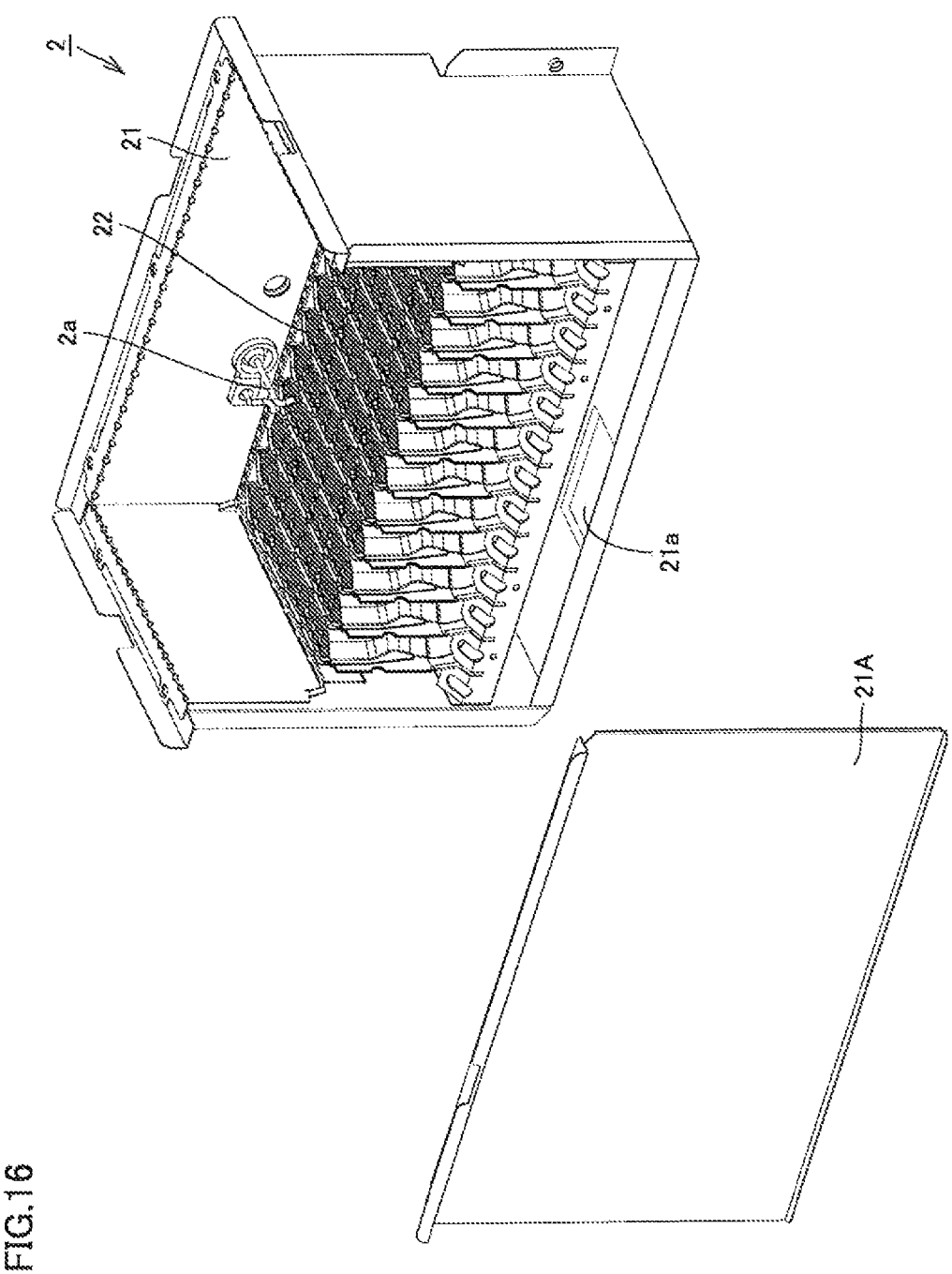
FIG. 16 is a perspective view schematically showing the configuration of an example of a combustion apparatus used in the water heater shown in FIG. 1.
Figure 17:
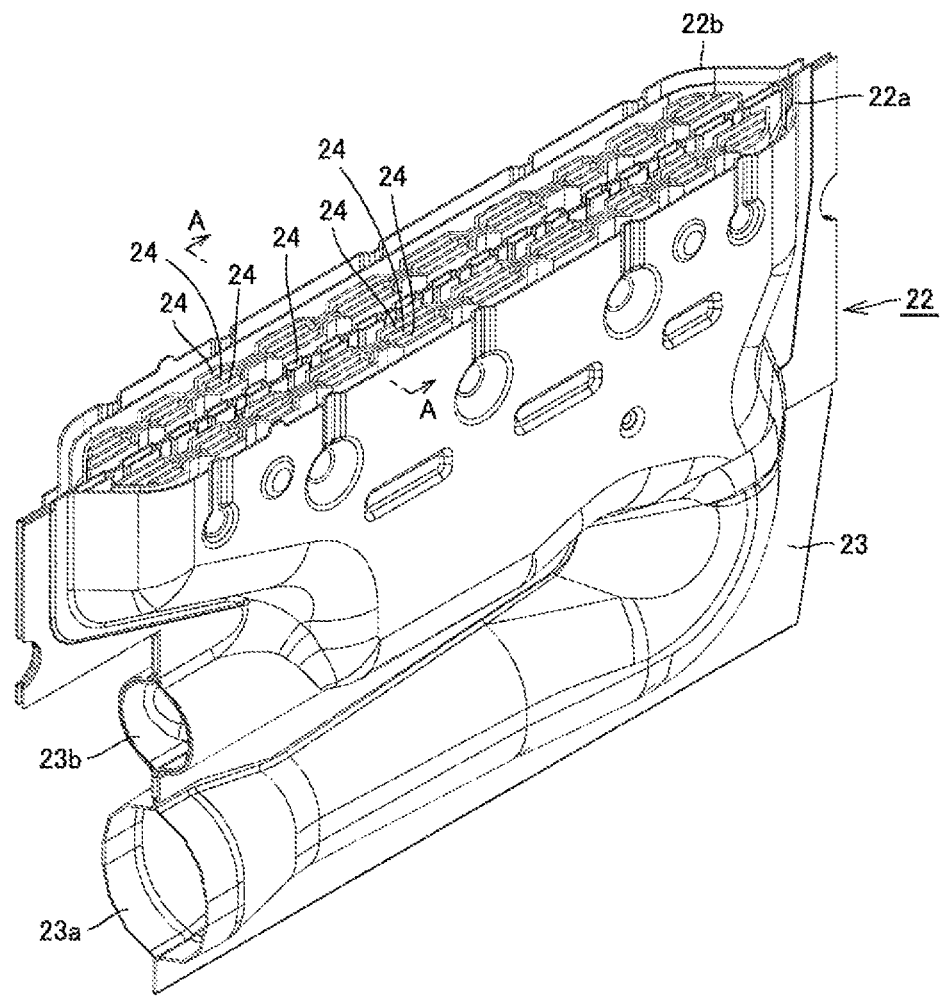
FIG. 17 is a perspective view schematically showing an example of the configuration of a burner used in the combustion apparatus shown in FIG. 16.
Figure 18:
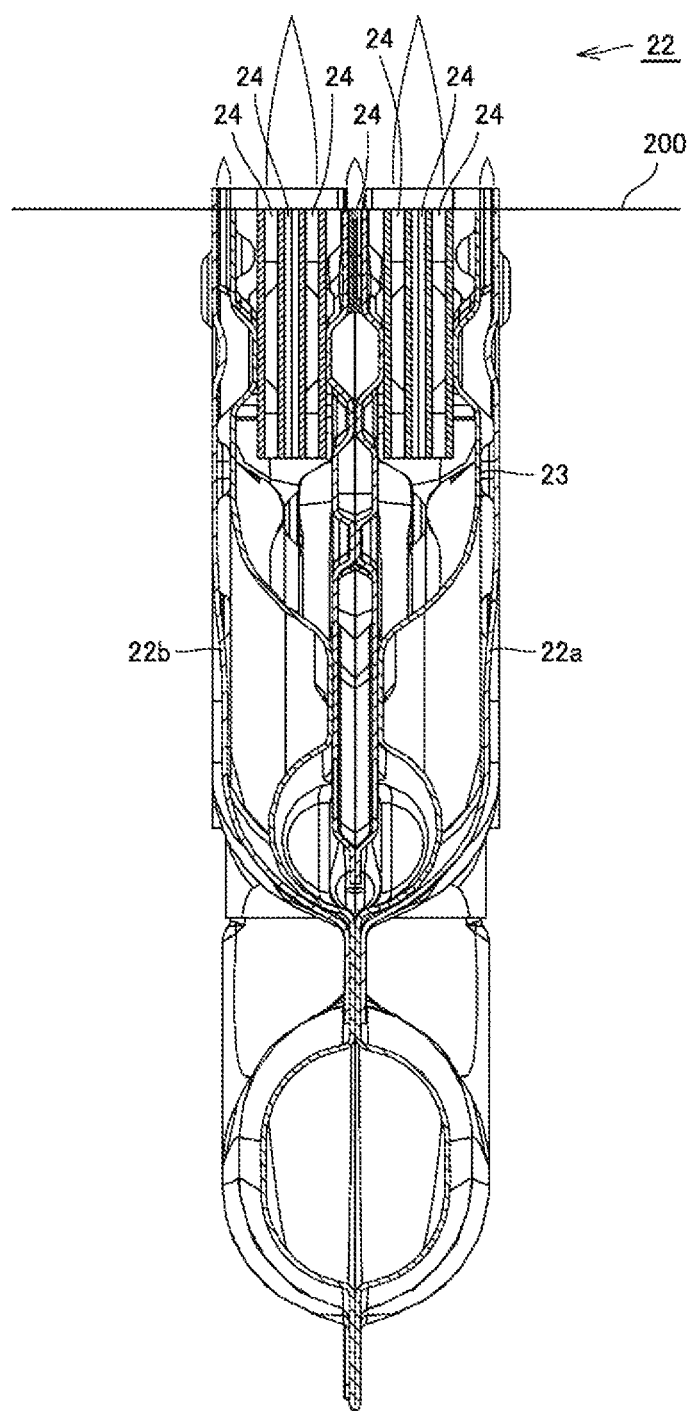
FIG. 18 is a schematic cross-sectional view taken along a line A-A in FIG. 17.

FIG. 16 is a perspective view schematically showing the configuration of an example of the combustion apparatus used in the water heater shown in FIG. 1 and also an exploded perspective view showing the state where a wall surface 21A of the burner case is removed. FIG. 17 is a perspective view schematically showing an example of the configuration of the burner used in the combustion apparatus shown in FIG. 16. FIG. 18 is a schematic cross-sectional view taken along a line A-A in FIG. 17.

Referring to FIG. 16, combustion apparatus 2 mainly has a burner case 21, a plurality of burners 22, and a spark plug 2a. Spark plug 2a attached to the wall surface of burner case 21 is disposed above the plurality of burners 22 (FIG. 16).

Referring to FIG. 17, each burner 22 mainly has a main body unit 23, a pair of burner units 22a and 22b disposed on the right and left sides, and a burner port portion 24 (FIG. 17).

Referring to FIGS. 17 and 18, main body unit 23 is provided with gas inlet ports 23a and 23b. Burner units 22a and 22b defined as one pair are attached to the right side and the left side, respectively, of main body unit 23. Burner port portion 24 is provided inside each of burner units 22a and 22b. In the present invention, a flat plane including openings of such plurality of burner port portions 24 is defined as a reference plane 200 (FIG. 18 and FIG. 2). It is preferable that this reference plane is a horizontal plane in the state where the water heater is placed.

(Primary Heat Exchanger)

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 22, and specifically, serves to heat water which flows through heat conduction pipe 3a of primary heat exchanger 3 with the quantity of heat generated as a result of the combustion operation of burner 22.

(Secondary Heat Exchanger)

Figure 3:
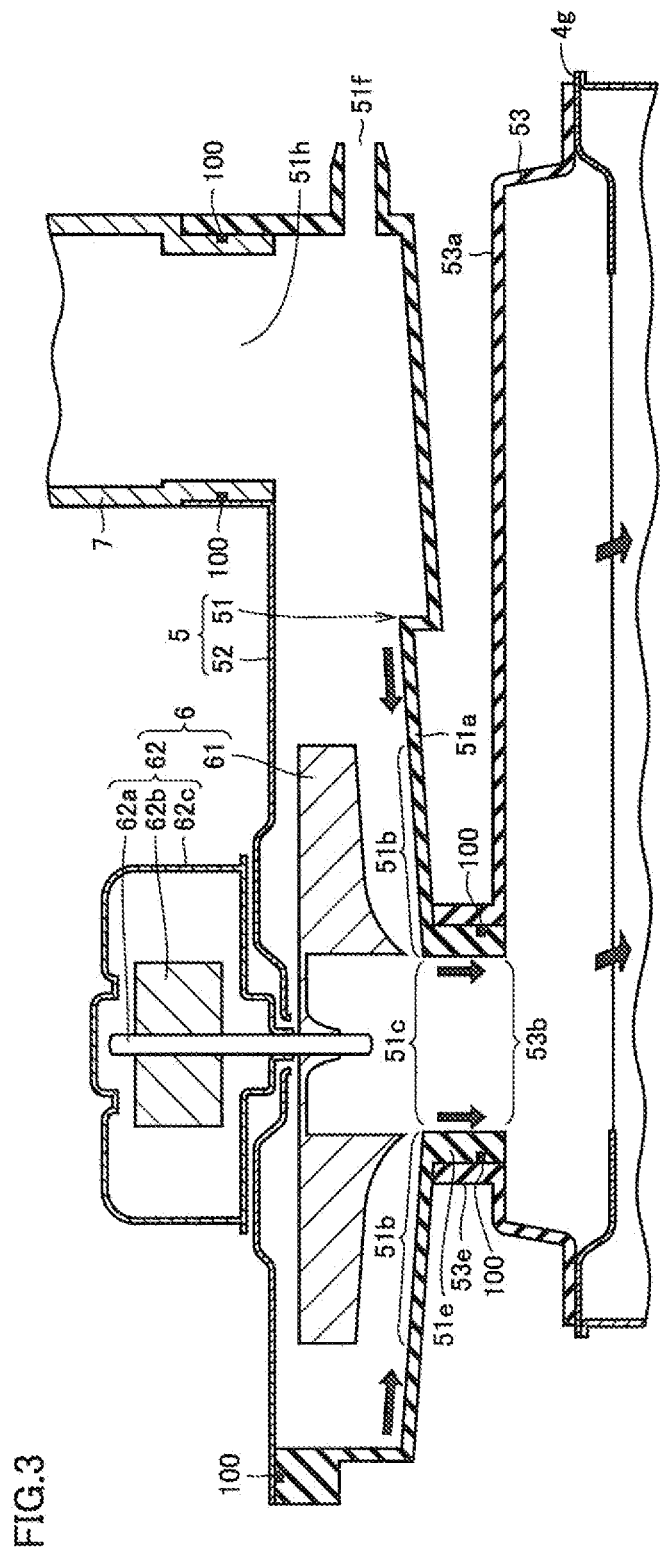
FIG. 3 is a partial cross-sectional front view for illustrating the configuration of a fan and the like of the water heater shown in FIG. 1.

Referring mainly to FIGS. 2 and 3, secondary heat exchanger 4 is a heat exchanger of a latent heat recovery type. This secondary heat exchanger 4 is located downstream of primary heat exchanger 3 in a flow of combustion gas and connected in series with primary heat exchanger 3. Since water heater 1 according to the present embodiment thus has secondary heat exchanger 4 of a latent heat recovery type, it is a water heater of the latent heat recovery type.

Secondary heat exchanger 4 mainly has a drainage water discharge port 4a, a heat conduction pipe 4b, a sidewall 4c, a bottom wall 4d, and an upper wall 4g. Heat conduction pipe 4b is layered as it is spirally wound. Sidewall 4c, bottom wall 4d, and upper wall 4g are arranged to surround heat conduction pipe 4b.

In secondary heat exchanger 4, water flowing through heat conduction pipe 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, thereby producing acid condensed water (drainage water). In the specification of the present invention, not only such condensed water but also unnecessary water such as incoming rainwater from the exhaust tube is referred to as drainage water.

Bottom wall 4d serves as a partition between primary heat exchanger 3 and secondary heat exchanger 4, and also serves as an upper wall of primary heat exchanger 3. This bottom wall 4d is provided with an opening 4e that allows communication between a space where heat conduction pipe 3a of primary heat exchanger 3 is arranged and a space where heat conduction pipe 4b of secondary heat exchanger 4 is arranged. As shown with hollow arrows in FIG. 2, combustion gas can flow from primary heat exchanger 3 to secondary heat exchanger 4 through opening 4e. In this embodiment, for the sake of simplification, although one common component is employed for bottom wall 4d of secondary heat exchanger 4 and the upper wall of primary heat exchanger 3, an exhaust collection and guide member may be connected between primary heat exchanger 3 and secondary heat exchanger 4.

Furthermore, upper wall 4g is only partially opened to provide a combustion gas exhaust port 4h. This combustion gas exhaust port 4h allows communication between the space where heat conduction pipe 4b of secondary heat exchanger 4 is arranged and an internal space in exhaust box 53. As shown with hollow arrows in FIG. 2, combustion gas can flow from secondary heat exchanger 4 into the internal space in exhaust box 53 through combustion gas exhaust port 4h.

Drainage water discharge port 4a is provided in sidewall 4c or bottom wall 4d. This drainage water discharge port 4a opens at a lowest position in the space surrounded by side wall 4c, bottom wall 4d and upper wall 4g (at a lowermost position in a vertical direction in the state where the water heater is placed), which is lower than the lowermost end of heat conduction pipe 4b. Thus, drainage water produced in secondary heat exchanger 4 can be guided to drainage water discharge port 4a along bottom wall 4d and sidewall 4c as shown with black arrows in FIG. 2.

(Exhaust Box)

Referring mainly to FIG. 2, exhaust box 53 forms a path for a flow of combustion gas between secondary heat exchanger 4 and fan 6. This exhaust box 53 can guide combustion gas of which heat has been exchanged in secondary heat exchanger 4 to fan 6. Exhaust box 53 is attached to secondary heat exchanger 4 and located downstream of secondary heat exchanger 4 in the flow of combustion gas.

Referring mainly to FIGS. 2 and 3, exhaust box 53 mainly has a ceiling wall 53a and an opening 53b. The internal space of exhaust box 53 communicates through combustion gas exhaust port 4h of secondary heat exchanger 4 with the internal space in which heat conduction pipe 4b of secondary heat exchanger 4 is disposed. As shown by black arrows in FIG. 2, the drainage water within exhaust box 53 is dripped through this combustion gas exhaust port 4h into secondary heat exchanger 4.

Figure 9:
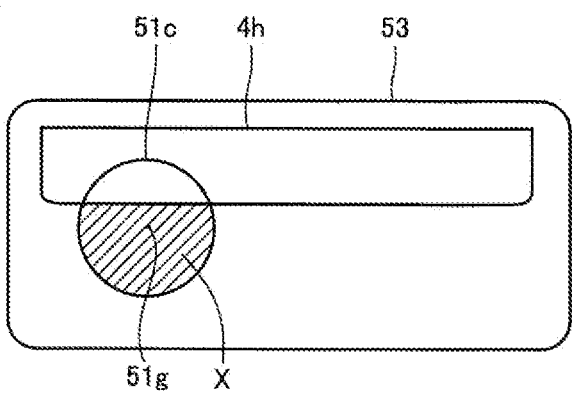
FIG. 9 is a schematic top view for illustrating arrangement of an inlet port in the fan case of the water heater, a flow path cross-sectional area of an exhaust box, and the like in the first embodiment.

Referring to FIG. 9, the flow path cross-sectional area in a cross section B-B of exhaust box 53 (see FIG. 4) that is parallel to the above-described reference plane is larger than the opening area of combustion gas exhaust port 4h and the opening area of inlet port 51c of the fan case. Accordingly, the flow velocity of combustion gas suctioned by the fan is lowered once within the exhaust box. Therefore, even if the drainage water within the heat exchanger is stirred up together with combustion gas, it stays within the exhaust box, so that the drainage water within the heat exchanger can be prevented from being suctioned into the fan. In addition, exhaust box 53 is not necessarily provided in the present invention.

(Fan)

Referring mainly to FIGS. 1 and 2, fan 6 serves to emit combustion gas (of which heat has been exchanged in secondary heat exchanger 4) which has passed through secondary heat exchanger 4 to the outside of water heater 1 by suctioning combustion gas, and the fan is connected to exhaust tube 7 leading to the outside of water heater 1.

This fan 6 is located downstream of exhaust box 53 and secondary heat exchanger 4 in the flow of combustion gas. Namely, in water heater 1, burner 22, primary heat exchanger 3, secondary heat exchanger 4, exhaust box 53, and fan 6 are arranged in this order from upstream to downstream in the flow of combustion gas produced in burner 22. Since combustion gas is suctioned and exhausted by means of fan 6 as above in this arrangement, water heater 1 in the present embodiment is a water heater adapted to an exhaust suction and combustion system.

Fan 6 mainly has an impeller 61, a fan case 5, a drive source 62, and a rotation shaft 62a. Fan case 5 is attached to exhaust box 53 such that an internal space in fan case 5 and opening 53b of exhaust box 53 communicate with each other (details of connection between fan case 5 and exhaust box 53 will be described later). Accordingly, combustion gas can be suctioned from the internal space of exhaust box 53 through inlet port 51c of fan case 5 into fan case 5. In addition, all of the generated combustion gas is suctioned through inlet port 51c of fan case 5 and emitted into exhaust tube 7. In other words, combustion gas does not flow into exhaust tube 7 without passing through fan case 5.

Referring mainly to FIG. 3, impeller 61 is arranged in fan case 5. This impeller 61 is connected to drive source 62 with rotation shaft 62a being interposed. Thus, impeller 61 is provided with drive force from drive source 62 and can rotate around rotation shaft 62a. In addition, drive source 62 in the present embodiment is a motor that mainly consists of rotation shaft 62a, a rotator 62b, and a case 62c. Impeller 61 is provided with a plurality of blades shaped as shown in FIG. 3 around rotation shaft 62a. With rotation of impeller 61, combustion gas within exhaust box 53 can be suctioned from the inner circumferential side of impeller 61 and can be emitted toward the outer circumferential side of impeller 61.

Figure 4:
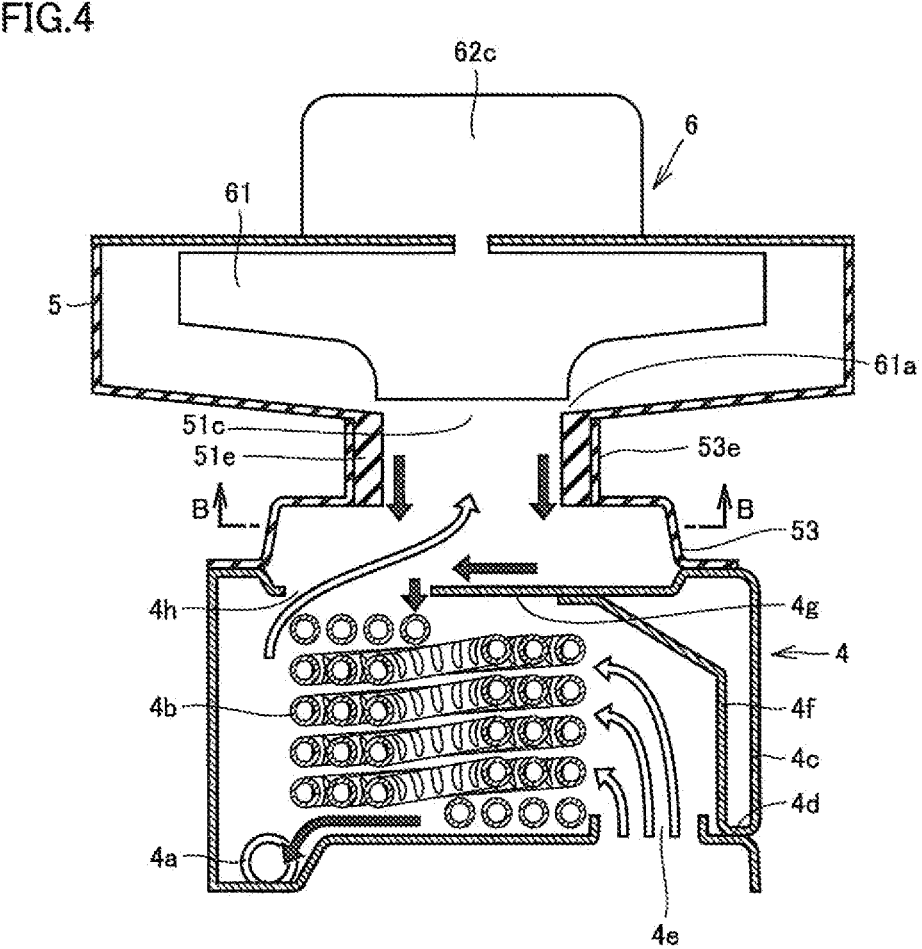
FIG. 4 is a partially enlarged view of FIG. 2.

Referring to FIG. 4, in a narrow space 61a where the distance between impeller 61 and the bottom wall of fan case 5 is the shortest, the distance between impeller 61 and the bottom wall of fan case 5 is set to be longer than the height of the drainage water that swells upward by its surface tension from the upper surface of the bottom wall of the fan case (for example, 1.5 mm). Accordingly, the drainage water, which flows into secondary heat exchanger 4 by gravity from the downstream portion (on the exhaust pipe side) of the fan case while the fan is stopped after combustion, flows into secondary heat exchanger 4 without staying in narrow space 61a, so that the drainage water is less likely to stay within the fan case.

Referring mainly to FIG. 1, exhaust tube 7 allows communication between the outside of water heater 1 and an opening 51h of fan case 5 on the outer circumferential side. Therefore, combustion gas emitted to the outer circumferential side by impeller 61 of fan 6 can be emitted to the outside of water heater 1 through exhaust tube 7.

Referring mainly to FIG. 2, combustion gas produced by burner 22 is suctioned by fan 6 with rotation of impeller 61 as above, so that combustion gas can reach fan 6 after passage through primary heat exchanger 3, secondary heat exchanger 4, and exhaust box 53 in this order as shown with the hollow arrows in the figure and can be exhausted to the outside of water heater 1.

Referring mainly to FIGS. 2 and 3, at least a part of the upper surface of bottom wall 51a of fan case 5 (fan case main body 51) is inclined with respect to reference plane 200 including openings of a plurality of burner port portions (FIG. 2 and FIG. 18). This allows the drainage water to be readily moved by gravity within fan case 5 (see black arrows shown in FIG. 3), so that the drainage water is less likely to stay within the fan case.

Furthermore, inlet port 51c is provided in bottom wall 51a of fan case main body 51 so as to be located at the position closest to secondary heat exchanger 4 in the direction perpendicular to reference plane 200 (FIG. 2 and FIG. 18) including the openings of the plurality of burner port portions. This allows the drainage water to be readily moved by gravity on the upper surface of the bottom wall of the fan case and dripped from the inlet port, so that the drainage water is less likely to stay within the fan case (see the black arrows shown in FIG. 3).

Figure 6:
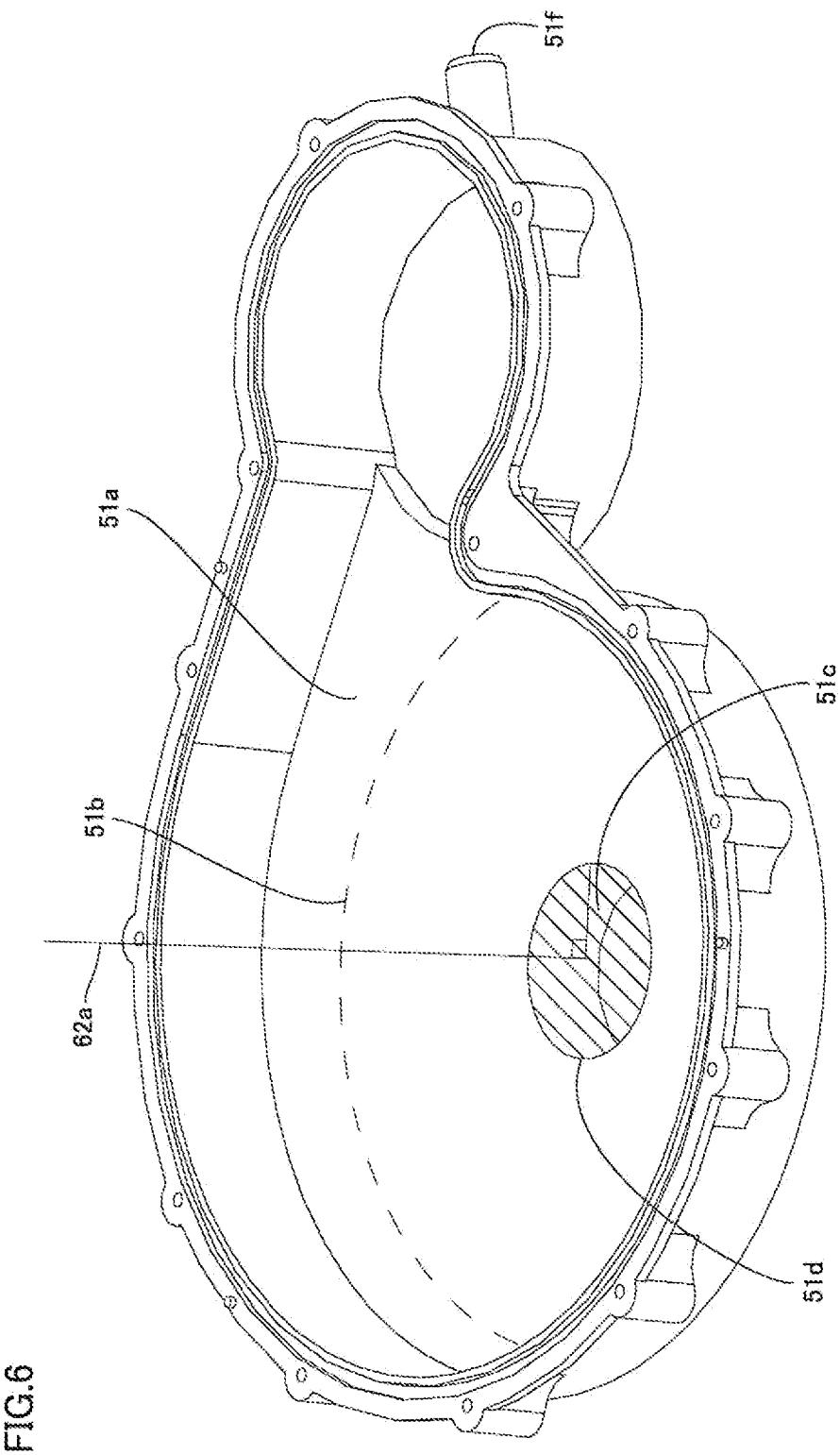
FIG. 6 is a perspective view schematically showing the configuration of a fan case of the water heater in the first embodiment.
Figure 8:
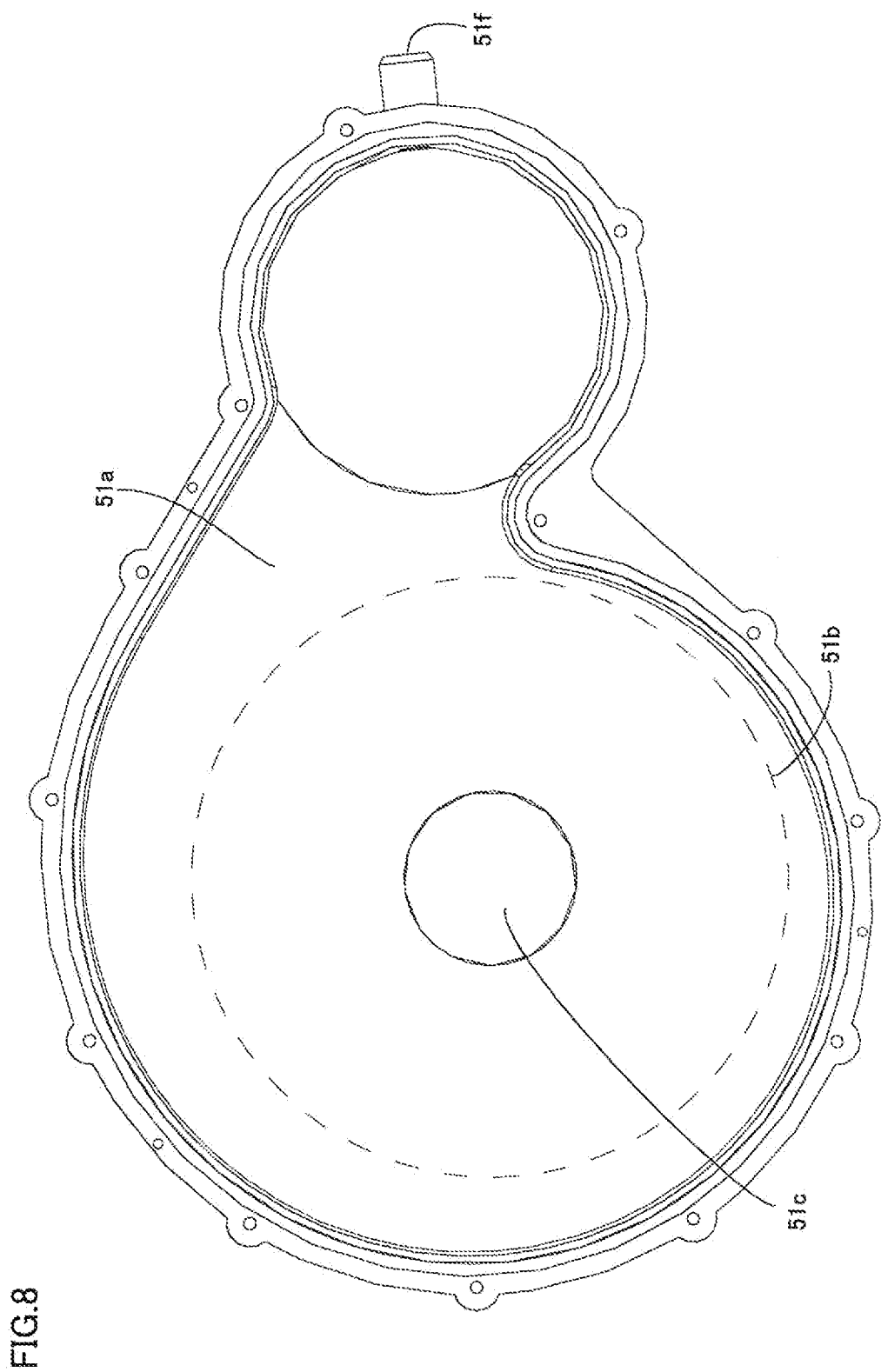
FIG. 8 is a schematic top view of the fan case shown in FIG. 6.

Furthermore, referring to FIGS. 3, 6, and 8, bottom wall 51a of the fan case main body has a portion corresponding to the area under impeller 61 (around inlet port 51c). This portion is formed in the shape of a grinding bowl so as to be gradually depressed as coming closer to rotation shaft 62a (inlet port 51c). In this way, at least an inner circumferential portion 51b on the upper surface of bottom wall 51a of fan case main body 51 that overlaps with impeller 61 as seen from the shaft direction of rotation shaft 62a has an inclined portion that is entirely inclined with respect to the above-described reference plane 200 so as to be closer to the heat exchanger as coming closer to inlet port 51c. This allows the drainage water to be readily moved more smoothly by gravity on the upper surface of the bottom wall of the fan case and dripped from the inlet port, so that the drainage water is further less likely to stay within the fan case. Furthermore, also in terms of improving the exhausting capability of fan 6, it is preferable that the upper surface of the bottom wall of the fan case is formed in such a shape.

It is preferable that the shaft direction of rotation shaft 62a of drive source (motor) 62 of the fan is perpendicular to reference plane 200 described above. Accordingly, for example, as compared with the case where the shaft direction of the rotation shaft is inclined with respect to reference plane 200, the entire fan is decreased in dimension in the direction perpendicular to the reference plane (in the height direction), so that space saving can be achieved for the fan, and the entire water heater can also be decreased in size. Furthermore, for example, as compared with the case where the shaft direction of the rotation shaft is inclined with respect to reference plane 200, the drainage water within the fan case is less likely to come into the drive source through the base portion of the rotation shaft, so that failures and the like of the drive source can be suppressed. Furthermore, there is also an advantage that the fan can be readily attached and detached during maintenance.

Inner circumferential portion 51b on the upper surface of bottom wall 51a of the fan case is inclined with respect to reference plane 200 (or rotation shaft 62a of the fan is inclined with respect to the direction perpendicular to the reference plane) at an angle of preferably 3° to 60°, more preferably 3° to 30°, and further more preferably 5° to 15°. In the case where the inclined angle is smaller than 3°, the upper surface of the bottom wall of the fan case may be approximately horizontal if the water heater is placed without being kept horizontal. Thus, the effect of the present invention may not be achieved. On the other hand, when the inclined angle is larger than 60°, the exhausting capability of fan 6 may deteriorate.

Figure 7:
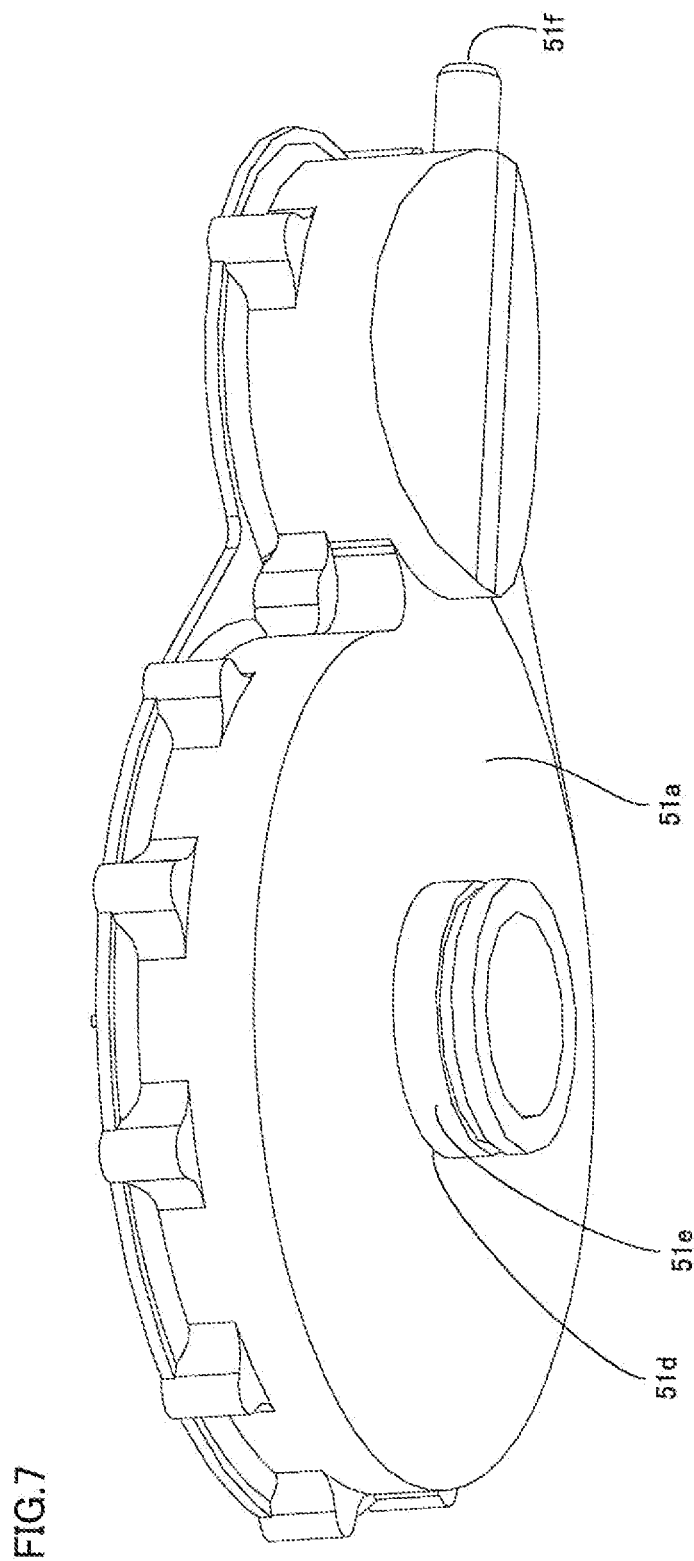
FIG. 7 is a perspective view of the fan case shown in FIG. 6 as seen from a different direction.

Referring mainly to FIGS. 3 and 7, details of connection between the fan case and the exhaust box will be hereinafter described. Fan case main body 51 has a first cylindrical portion 51e that is formed of a circumferential wall protruding from a circumferential edge portion 51d of inlet port 51c of bottom wall 51a toward secondary heat exchanger 4. In contrast, exhaust box 53 has a ceiling wall 53a having an opening 53b and a second cylindrical portion 53e that is formed of a circumferential wall protruding from circumferential edge portion 51d (see FIG. 6) of opening 53b of ceiling wall 53a toward the fan case. First cylindrical portion 51e is fitted into second cylindrical portion 53e, thereby connecting the fan case and the exhaust box.

Accordingly, the internal space of the fan case communicates with the internal space of the exhaust box through the internal space of first cylindrical portion 51e, and the drainage water within fan case 5 flows by gravity through first cylindrical portion 51e into exhaust box 53 as shown by black arrows.

Furthermore, the distance corresponding to each height of first cylindrical portion 51e and second cylindrical portion 53e is ensured between the inlet port of the fan case and the combustion gas exhaust port of the heat exchanger. Accordingly, the drainage water within the heat exchanger can be suppressed from being stirred up by the fan together with combustion gas, so that the drainage water is less likely to stay within the fan case. In order to achieve such an effect of suppressing stirring up of the drainage water, the distance between the inlet port 51c of the fan case and one of upper wall 4g of the secondary heat exchanger and heat conduction pipe 4b on the uppermost stage of the secondary heat exchanger that is closer to the fan, as well as each height of first cylindrical portion 51e and second cylindrical portion 53e, is set at a sufficient length (for example, 15 mm or more) to achieve such an effect.

Furthermore, since first cylindrical portion 51e is fitted into second cylindrical portion 53e, drainage water can be prevented from leaking to the outside of the path through a gap in the joint portion between first cylindrical portion 51e and second cylindrical portion 53e when drainage water drips from the inlet port of the fan case. Similarly, as to a connection portion between the components forming an exhaust path of the water heater, it is preferable that the connection portion on the upstream side of the flow of combustion gas (on the lower side in the vertical direction) is formed in a female type while the connection portion on the downstream side of the flow of combustion gas (on upper side in the vertical direction) is formed in a male type. Accordingly, drainage water can be prevented from leaking to the outside of the path when the drainage water drips through the exhaust path.

Furthermore, a seal member 100 is interposed between the outer circumferential surface of first cylindrical portion 51e and the inner circumferential surface of second cylindrical portion 53e. Accordingly, leakage of the drainage water is more reliably prevented, so that it becomes possible to prevent harmful effects such as a decrease in the heat exchange efficiency that is caused by the decreased proportion of combustion gas resulting from suctioning of air outside the exhaust path. In addition, since the fan case and the exhaust box are connected by a cylindrical portion, an O ring can be used as a seal member. Furthermore, for the similar reason, it is preferable that every connection portion between components forming the exhaust path is sealed by a seal member such as an O ring or a gasket.

Referring mainly to FIGS. 3 and 9, at least a part X of inlet port 51c of the fan case (FIG. 9) does not overlap with combustion gas exhaust port 4h of the secondary heat exchanger as seen from the direction of rotation shaft 62a. Thereby, as compared with the case where the entire inlet port of the fan case overlaps with the combustion gas exhaust port of the heat exchanger, the drainage water within the heat exchanger can be suppressed from being stirred up by the fan together with combustion gas, so that the drainage water is less likely to stay within the fan case. In order to exhibit such an effect with more reliability, as seen from the direction of rotation shaft 62a, it is preferable that center of gravity 51g of inlet port 51c does not overlap with combustion gas exhaust port 4h of the secondary heat exchanger (FIG. 9), and more preferable that the entire inlet port 51c of the fan case does not overlap with combustion gas exhaust port 4h of the secondary heat exchanger (not shown).

One end of the bottom wall of the fan case main body on the outer circumferential side (an end on the exhaust tube side) is provided with a drainage water discharge port 51f for discharging the incoming drainage water (rainwater and condensed water that has flowed backward) from exhaust tube 7. In addition, a portion located on the exhaust tube side of the upper surface of the bottom wall of the fan case main body onto which the drainage water drips from exhaust tube 7 is lower in height than inner circumferential portion 51b on the upper surface of the bottom wall of the fan case main body. Accordingly, even when the drainage water drips from exhaust tube 7, such drainage water can be prevented from moving into the fan case (toward fan 6), so that deterioration of the impeller caused by the drainage water is suppressed.

Furthermore, it is preferable that the connection portion (sealing surface) and the like between fan case lid 52 and fan case main body 51 is designed so as to be located on the upper side in the vertical direction. Thus, the drainage water can be prevented from leaking to the outside of the path, thereby preventing the sealing surface from coming into contact with the drainage water, so that deterioration of the seal can be suppressed.

Furthermore, as shown in FIG. 3, fan case 5 has an opening 51h in a portion connected to exhaust tube 7. It is preferable that opening 51h is located so as not to overlap with impeller 61 as seen from the direction of the rotation shaft. Accordingly, even when drainage water and moisture drip from exhaust tube 7, such drainage water and moisture do not drip directly onto impeller 61 of fan 6. Therefore, deterioration of impeller 61 caused by the drainage water is suppressed.

Although the material of each component forming the water heater is not particularly limited, it is preferable that, for example, impeller 61 of fan 6, fan case main body 51, exhaust box 53, and exhaust tube 7 each are made of a resin material having acid resistance. Examples of the resin material having acid resistance may be polyphenylene sulfide (PPS), syndiotactic polystyrene (SPS), polyvinyl chloride (PVC), phenol resin, epoxy resin, silicone resin, fluororesin such as polytetrafluoroethylene, unsaturated polyester resin, melamine resin, polycarbonate resin, methacrylstyrene (MS) resin, methacryl resin, AS resin (styrene acrylonitrile copolymer), ABS resin (acrylonitrile, butadiene, styrene copolymerization synthetic resin), polyethylene, polypropylene, polystyrene, and polyethylene terephthalate (PET). By using such a material, deterioration of components caused by coming into contact with drainage water is suppressed.

(Drainage Water Tank)

Referring mainly to FIG. 1, drainage water tank 8 serves to store drainage water produced in secondary heat exchanger 4. The acid drainage water stored in drainage water tank 8 is for example temporarily stored in the internal space of drainage water tank 8, and then, usually discharged through a drainage water discharge pipe 15 to the outside of water heater 1.

It is to be noted that the lower portion of drainage water tank 8 is connected to a drainage water outlet pipe 6 separately from drainage water discharge pipe 15. This drainage water outlet pipe 16 (usually closed) is designed to be opened during maintenance or the like, thereby allowing discharge of the drainage water within drainage water tank 8 that cannot be discharged through drainage water discharge pipe 15. An internal space in drainage water tank 8 may be filled with a neutralization agent (not shown) for neutralizing acid drainage water.

Referring mainly to FIG. 1, drainage water tank 8 and drainage water discharge port 4a of secondary heat exchanger 4 are connected by a drainage water discharge pipe 10.

(Pipe)

Referring mainly to FIG. 1, a gas supply pipe 11 is connected to burner 22. Water supply pipe 12 is connected to heat conduction pipe 4b of secondary heat exchanger 4 (see FIG. 2) and hot water delivery pipe 13 is connected to heat conduction pipe 3a of primary heat exchanger 3 (see FIG. 2). Heat conduction pipe 3a of primary heat exchanger 3 and heat conduction pipe 4b of secondary heat exchanger 4 are connected to each other through connection pipe 14. Each of gas supply pipe 11, water supply pipe 12, and hot water delivery pipe 13 leads to the outside, for example, in a top portion of water heater 1.

Since water heater 1 adapted to the exhaust suction and combustion system is employed as described above in the present embodiment, a combustion operation by burner 22 can be stabilized as compared with a water heater of what is called a forced exhaust type even though exhaust tube 7 is decreased in diameter, which will be described below.

In a water heater of what is called a forced exhaust type, a fan, a burner, a primary heat exchanger, and a secondary heat exchanger are arranged in this order from upstream to downstream in a flow of combustion gas. Namely, combustion gas produced in the burner is caused to flow into an exhaust tube outside the water heater by the fan through the primary heat exchanger and the secondary heat exchanger.

Combustion gas forced out of the fan receives flow path resistance produced by the primary heat exchanger and the secondary heat exchanger before it reaches the exhaust tube. Therefore, a pressure with which combustion gas is sent, immediately before the exhaust tube, is lower by magnitude comparable to this flow path resistance. Therefore, in order to force combustion gas into the exhaust tube smaller in diameter, a fan blow pressure should be raised. When a fan blow pressure is raised, however, an internal pressure within a burner case becomes higher. Therefore, when a supply pressure of combustion gas supplied to the burner is low, a combustion operation becomes unstable.

In contrast, according to the exhaust suction and combustion system in the present embodiment, burner 22, primary heat exchanger 3, secondary heat exchanger 4, and fan 6 are arranged in this order from upstream to downstream in the flow of combustion gas. With this system, since a pressure is negative on the upstream side of fan 6, a blow pressure by fan 6 does not have to be raised. Thus, since an internal pressure within the burner case can be maintained low even though exhaust tube 7 is decreased in diameter, a combustion operation can be stabilized even when a supply pressure of combustion gas supplied to burner 22 is low.

Second Embodiment

Figure 10:
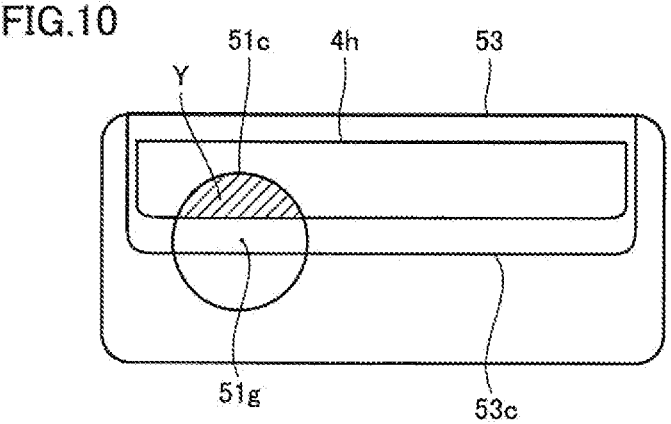
FIG. 10 is a schematic top view for illustrating the size and the like of a deflection plate of an exhaust box of a water heater in the second embodiment.

The configuration of a water heater in the second embodiment will be hereinafter described with reference to FIGS. 5 and 10.

Figure 5:
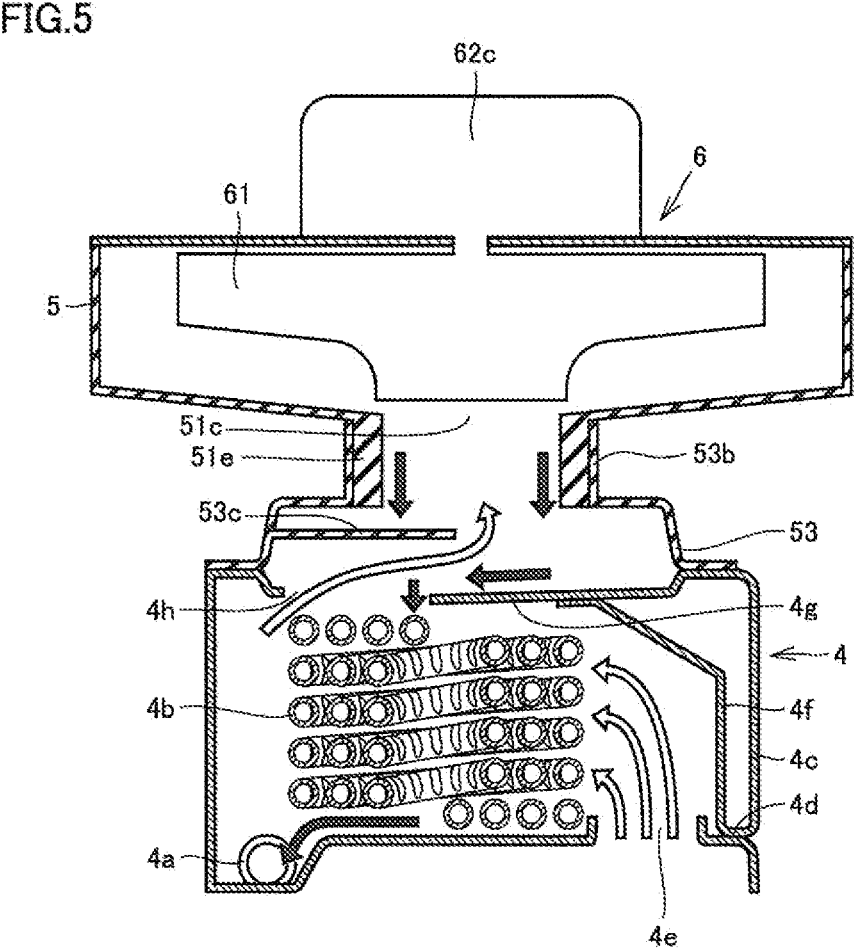
FIG. 5 is a partially enlarged view similar to that in FIG. 4 and schematically showing the configuration of a water heater in the second embodiment.

As compared with the water heater (FIG. 4) in the first embodiment, the water heater of the present embodiment is different from that in the first embodiment in the point that exhaust box 53 has a deflection plate 53c; and upper wall 4g of secondary heat exchanger 4 is inclined with respect to the reference plane so as to be closer to heat conduction pipe 4b as coming closer to combustion gas exhaust port 4h (FIG. 5). The water heater of the present embodiment is however similar in other points to that in the first embodiment.

Referring to FIG. 5, in the present embodiment, exhaust box 53 has a deflection plate 53c between combustion gas exhaust port 4h of secondary heat exchanger 4 and inlet port 51c of fan case 5 so as to be spaced apart from combustion gas exhaust port 4h and inlet port 51c. Furthermore, referring to FIG. 10, deflection plate 53c blocks a portion Y at which at least inlet port 51c and combustion gas exhaust port 4h overlap with each other as seen from the direction of the rotation shaft of the drive source. The flow path cross-sectional area in a cross section of the deflection plate that is parallel to the reference plane is not smaller than the opening area of combustion gas exhaust port 4h and is larger than the opening area of inlet port 51c of the fan case. Accordingly, even if deflection plate 53c is provided, the flow path resistance of exhaust box 53 is not so increased.

In the present embodiment, since exhaust box 53 has such a deflection plate 53c, the upward flow of combustion gas suctioned by a fan is deflected once in the lateral direction by the deflection plate. Accordingly, even if the drainage water within the heat exchanger is stirred up together with combustion gas, such drainage water stays below the deflection plate within the exhaust box, so that the drainage water within the heat exchanger can be more reliably prevented from being suctioned into the fan.

Furthermore, upper wall 4g of secondary heat exchanger 4 is inclined with respect to the reference plane so as to be closer to heat conduction pipe 4b as coming closer to combustion gas exhaust port 4h. Accordingly, the drainage water is moved smoothly by gravity on the upper surface of upper wall 4g of secondary heat exchanger 4 corresponding to the bottom wall of exhaust box 53 and then dripped from the inlet port, so that the drainage water is less likely to stay within the exhaust box.

Third Embodiment

The configuration of the water heater in the third embodiment will be hereinafter described with reference to FIGS. 11 to 13.

Figure 11:
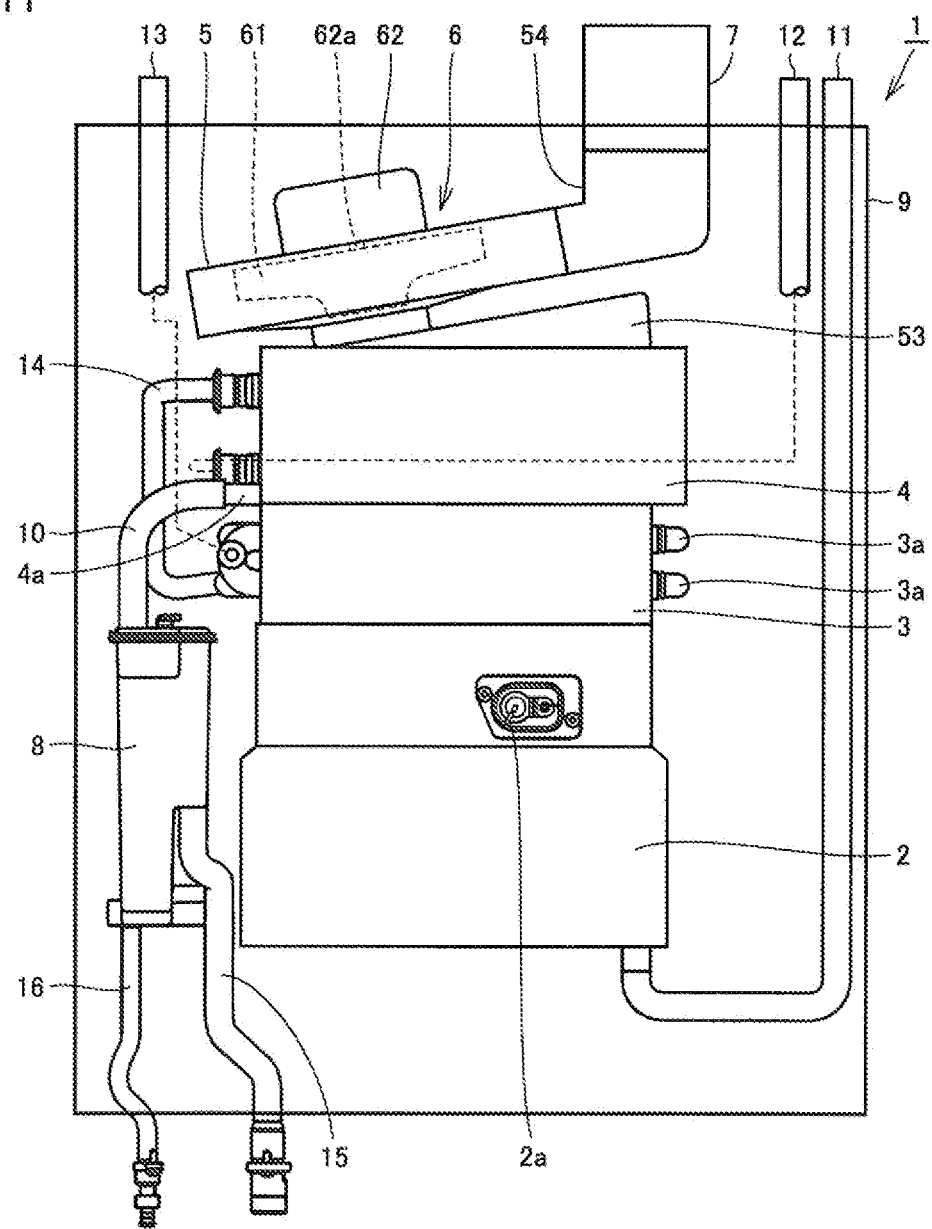
FIG. 11 is a front view schematically showing the configuration of a water heater in the third embodiment.
Figure 12:
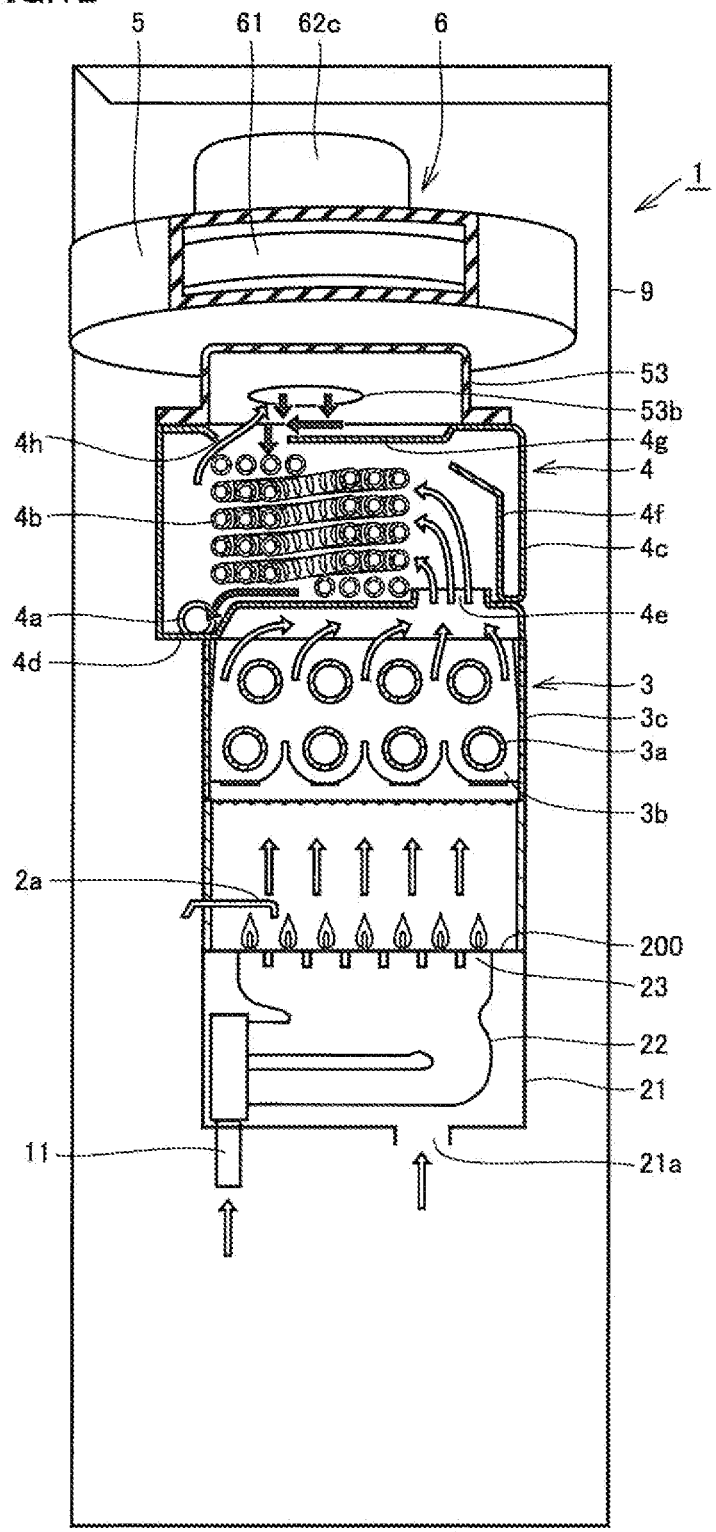
FIG. 12 is a partial cross-sectional side view schematically showing the configuration of the water heater shown in FIG. 11.

Referring mainly to FIGS. 11 and 12, water heater 1 in the present embodiment is a water heater of a latent heat recovery type adapted to an exhaust suction and combustion system. This water heater 1 mainly includes a combustion apparatus 2, a primary heat exchanger 3, a secondary heat exchanger 4, an exhaust box 53, a fan 6, an exhaust tube 7, a drainage water tank 8, a housing 9, and pipes 10 to 16. The same description as that in the first embodiment will not be repeated.

(Exhaust Box)

Exhaust box 53 does not necessarily need to be provided in the present invention, but generally needs to be provided in the present embodiment for air-tightly or liquid-tightly connecting the inclined bottom wall of fan case 5 and upper wall 4g of secondary heat exchanger 4.

Figure 13:
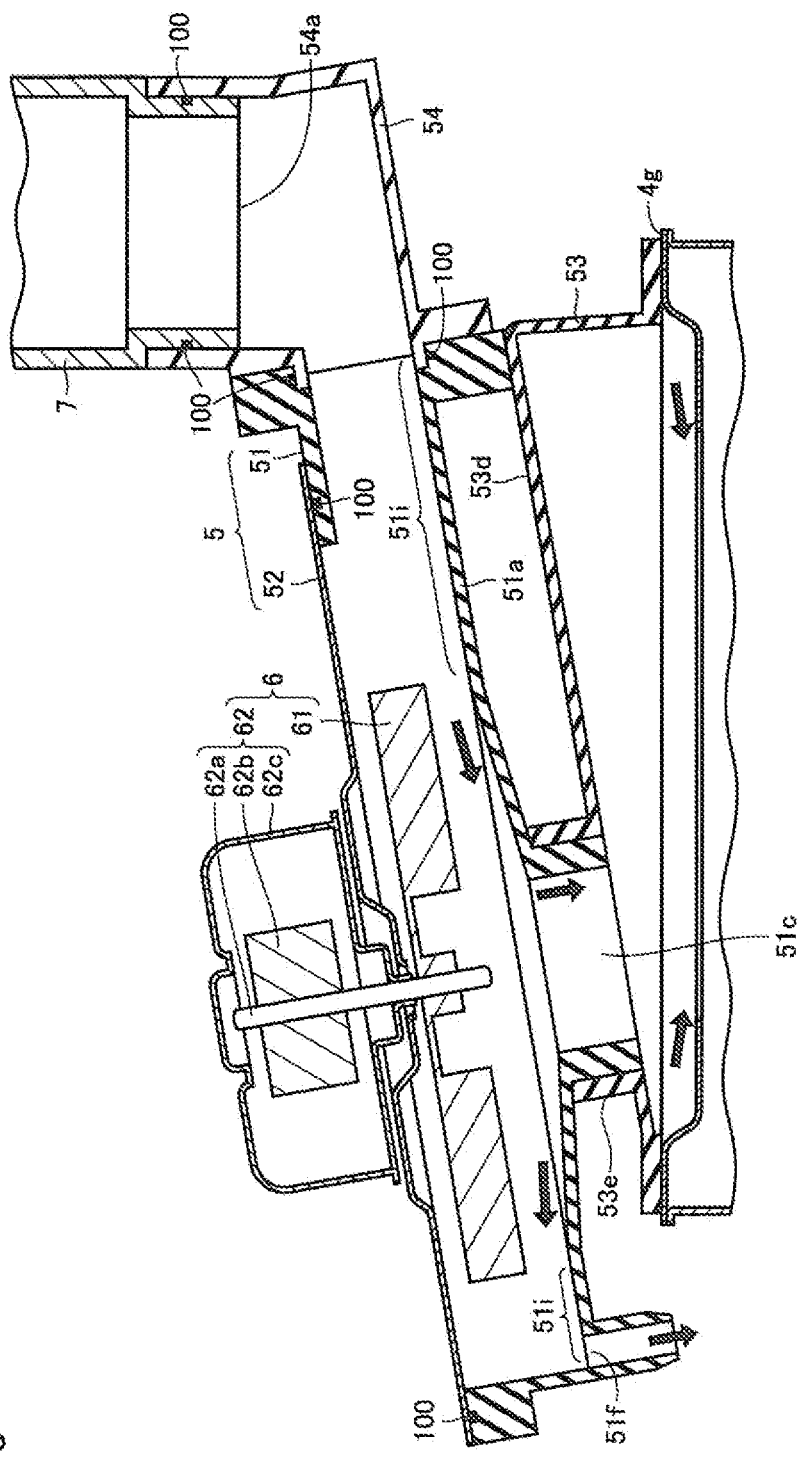
FIG. 13 is a partial cross-sectional view for illustrating the configuration of a fan and the like of the water heater shown in FIG. 11.

Referring mainly to FIGS. 12 and 13, exhaust box 53 mainly includes a box main body 53d and a fan connection portion 53e. The internal space of box main body 51d communicates through combustion gas exhaust port 4h of secondary heat exchanger 4 with the internal space in which heat conduction pipe 4b of secondary heat exchanger 4 is disposed. As shown by black arrows in FIG. 12, the drainage water within exhaust box 53 drips through this combustion gas exhaust port 4h onto secondary heat exchanger 4.

Furthermore, fan connection portion 53e is provided so as to protrude from the upper portion of box main body 51d. This fan connection portion 53e has a cylindrical shape, for example, and has an internal space that communicates with the internal space of box main body 51d and forms inlet port 51c. As shown by the black arrows in FIG. 12, the drainage water within fan case 5 drips through this inlet port 51d into exhaust box 53.

(Fan)

Referring mainly to FIGS. 11 and 12, fan 6 serves to emit combustion gas (of which heat has been exchanged in secondary heat exchanger 4) which has passed through secondary heat exchanger 4 to the outside of water heater 1 by suctioning combustion gas, and this fan is connected through exhaust joint 54 to exhaust tube 7 leading to the outside of water heater 1.

Fan 6 mainly has an impeller 61, a fan case 5, a drive source 62, and a rotation shaft 62a. Fan case 5 is attached to fan connection portion 53e of exhaust box 53 such that an internal space of fan case 5 and an internal space of fan connection portion 53e communicate with each other. Accordingly, combustion gas can be suctioned from box main body 53a of exhaust box 53 through inlet port 51c within fan connection portion 53e into fan case 5.

Referring mainly to FIG. 11, exhaust tube 7 is disposed outside water heater 1 with exhaust joint 54 interposed therebetween and is connected to the outer circumferential side of fan case 5. Accordingly, combustion gas discharged to the outer circumferential side by impeller 61 of fan 6 can be discharged to the outside of water heater 1 through exhaust tube 7.

Referring to FIG. 13, at least a part of the upper surface of bottom wall 51a of fan case 5 (fan case main body 51) is inclined with respect to reference plane 200 (FIG. 12 and FIG. 18) including openings of a plurality of burner port portions. This allows the drainage water to be readily moved by gravity within fan case 5 (as shown by black arrows in FIG. 13), so that the drainage water is less likely to stay within the fan case. In addition, it is preferable that the upper surface of bottom wall 51a of fan case 5 is inclined such that its portion closer to exhaust tube 7 is located at a relatively higher position in order to allow combustion gas to be smoothly emitted. However, the present invention is not limited to the above configuration, but the upper surface of bottom wall 51a of fan case 5 may be inclined such that the front side of the water heater is located at a lower position.

Furthermore, it is preferable that a portion 51i on the upper surface of bottom wall 51a of fan case 5 that is at least located on the outer circumferential side relative to impeller 61 is inclined with respect to reference plane 200. In the state where impeller 61 within the fan case is rotating, the drainage water is suctioned or scattered in a portion on the upper surface of bottom wall 51a of the fan case that corresponds to the area under impeller 61. Accordingly, the drainage water can be readily prevented from being moved by gravity. On the other hand, the drainage water is less influenced by rotation of impeller 61 in portion 51i on the upper surface of bottom wall 51a of fan case 5 that is located on the outer circumferential side relative to impeller 61. Accordingly, portion 51i on the outer circumferential side is inclined, thereby allowing the drainage water to be moved by gravity, so that the drainage water is less likely to stay within the fan case. Furthermore, it is preferable that the bottom wall of the fan case is provided with drainage water discharge port 51f at the lowermost position in the vertical direction in the state where water heater 1 is placed.

In addition, FIG. 13 shows that a portion on bottom wall 51a of fan case 5 that corresponds to the area under impeller 61 (around inlet port 51c) is formed in the shape of a grinding bowl so as to be gradually depressed as coming closer to rotation shaft 62a (inlet port 51c). Such a shape is preferable in terms of improving the exhausting capability of fan 6. However, it is also preferable that the upper surface of bottom wall 51a of this portion is also inclined with respect to reference plane 200. Accordingly, the drainage water is moved spontaneously by its weight toward the lower part (in the direction indicated by the black arrows in the figure) on the entire upper surface of bottom wall 51a of fan case 5, so that the drainage water is less likely to stay within the fan case. Furthermore, it is preferable that the upper surface of the bottom wall of each of fan case 5 and exhaust joint 54 is inclined with respect to the above-described reference plane.

Furthermore, it is preferable that the upper surface of impeller 61 is also inclined with respect to reference plane 200 described above. This is because, if the impeller is parallel to the reference plane (horizontal in the state where the water heater is placed), the drainage water is more likely to stay on the upper surface of the impeller and the like, which causes a problem that deterioration of the impeller is more likely to progress.

It is preferable that the rotation shaft of the motor of the fan is inclined with respect to the direction perpendicular to the above-described reference plane (preferably to a horizontal plane in the state where the water heater is placed). Consequently, the drainage water can be prevented from coming into a motor through a base portion of the rotation shaft and causing a failure of the motor.

The upper surface of the bottom wall of each of the fan case and the exhaust joint is inclined with respect to the reference plane (or the rotation shaft of the fan is inclined with respect to the direction perpendicular to the reference plane) at an angle of preferably 3° to 87°, more preferably 3° to 30°, and further more preferably 5° to 15°. In the case where the inclined angle is smaller than 3°, the upper surface of the bottom wall of the fan case may be approximately horizontal when the water heater is placed without being kept horizontal. Thus, the effect of the present invention may not be achieved. On the other hand, in the case where the inclined angle is larger than 87°, the upper surface of the bottom wall of the fan case may be approximately vertical when the water heater is placed without being kept horizontal. Thus, the drainage water may come into the motor through the base portion of the rotation shaft, which may lead to a failure of the motor.

As to a connection portion between the components forming an exhaust path, it is preferable that the connection portion on the upstream side in the flow of combustion gas (on the lower side in the vertical direction) is formed in a female type while the connection portion on the downstream side in the flow of combustion gas (on the upper side in the vertical direction) is formed in a male type. Furthermore, it is preferable that the each connection portion between the components forming the exhaust path is sealed by an O ring or a gasket. In this way, the drainage water can be prevented from leaking to the outside of the path when the drainage water drips through the exhaust path.

Furthermore, it is preferable that the connection portion (sealing surface) between fan case lid 52 and fan case main body 51, and the like are designed to be located on the upper side in the vertical direction. Thus, the drainage water can be prevented from leaking to the outside of the path, thereby preventing the sealing surface from coming into contact with the drainage water, so that deterioration of the seal can be suppressed.

As shown in FIG. 13, in the case where exhaust joint 54 for connecting fan case 5 and exhaust tube 7 leading to the outside of the water heater is provided, it is preferable that exhaust joint 54 has an opening 54a at a portion connected to exhaust tube 7, and this opening 54a is located so as not to overlap with impeller 61 as seen from the direction perpendicular to reference plane 200. Accordingly, even in the case where drainage water and moisture drip from exhaust tube 7, such drainage water and moisture do not directly drip onto impeller 61 of fan 6, so that deterioration of impeller 61 caused by drainage water is suppressed. Furthermore, the drainage water is moved by gravity without being stirred up by impeller 61, with the result that the drainage water is less likely to stay within the fan case.

It is preferable that impeller 61 of fan 6, fan case main body 51, exhaust box 53, exhaust joint 54, and exhaust tube 7 each are made of a resin material having acid resistance similar to that in the first embodiment.

Fourth Embodiment

Figure 14:
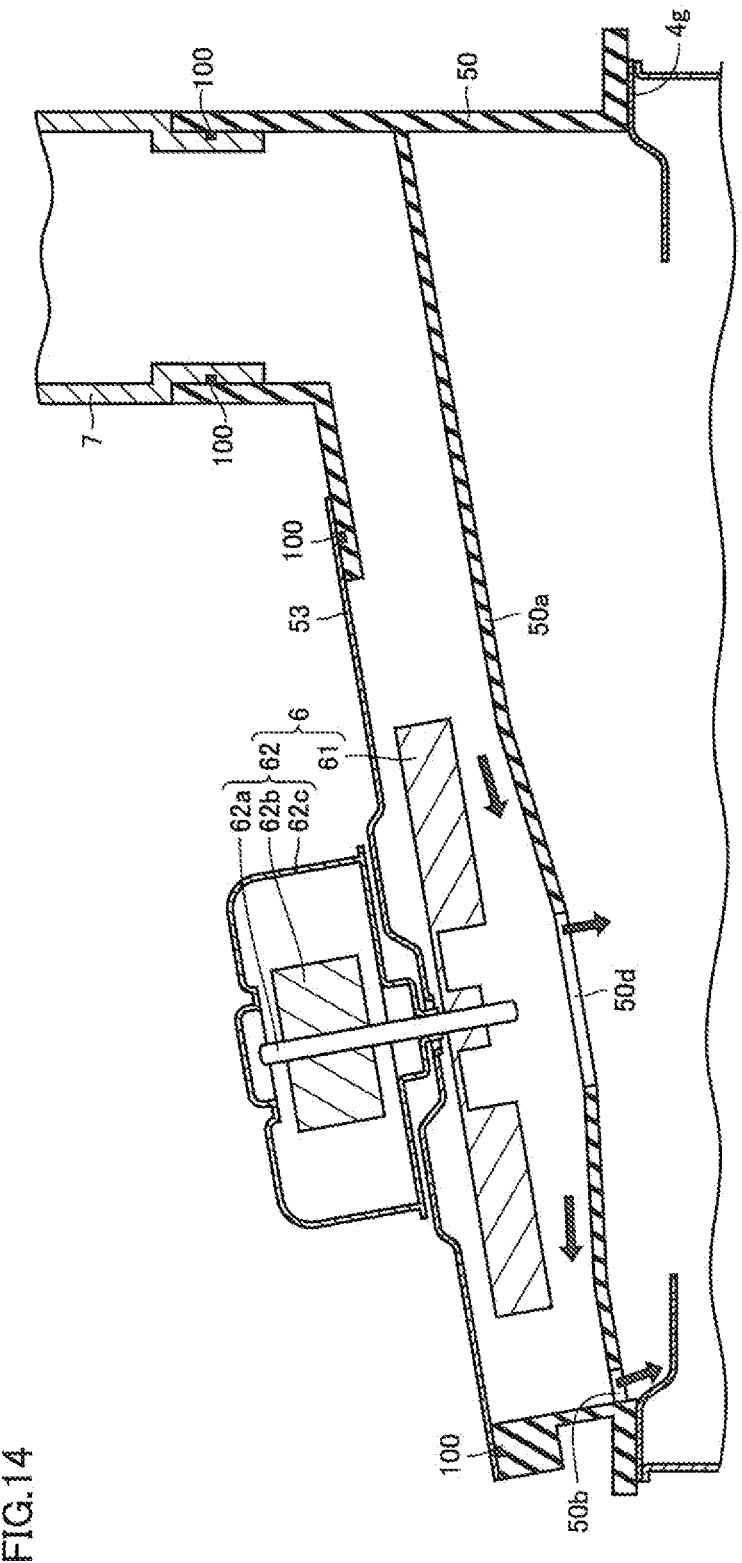
FIG. 14 is a partial cross-sectional view for illustrating the configuration of a fan and the like of a water heater in the fourth embodiment.

The configuration of a water heater in the fourth embodiment will be hereinafter described with reference to FIG. 14.

The water heater of the present embodiment is different from that in the third embodiment in the point that fan case main body 51, exhaust box 53, and exhaust joint 54 in the third embodiment (FIG. 13) are formed of an integrated structure 50 (FIG. 14), but this water heater is similar in other points to that in the third embodiment.

In the present embodiment, the fan case main body, the exhaust box, and the exhaust joint are integrally formed, thereby eliminating the need to perform an operation to assemble components, so that the water heater can be readily manufactured. Furthermore, as compared with the case where components are assembled, there is an advantage that the drainage water can be prevented from leaking to the outside. In addition, it is preferable that bottom wall 50a of the fan case has drainage water discharge port 50b at the lowermost position in the vertical direction in the state where water heater 1 is placed.

Fifth Embodiment

The configuration of a water heater in the fifth embodiment will be hereinafter described with reference to FIG. 15.

Figure 15:
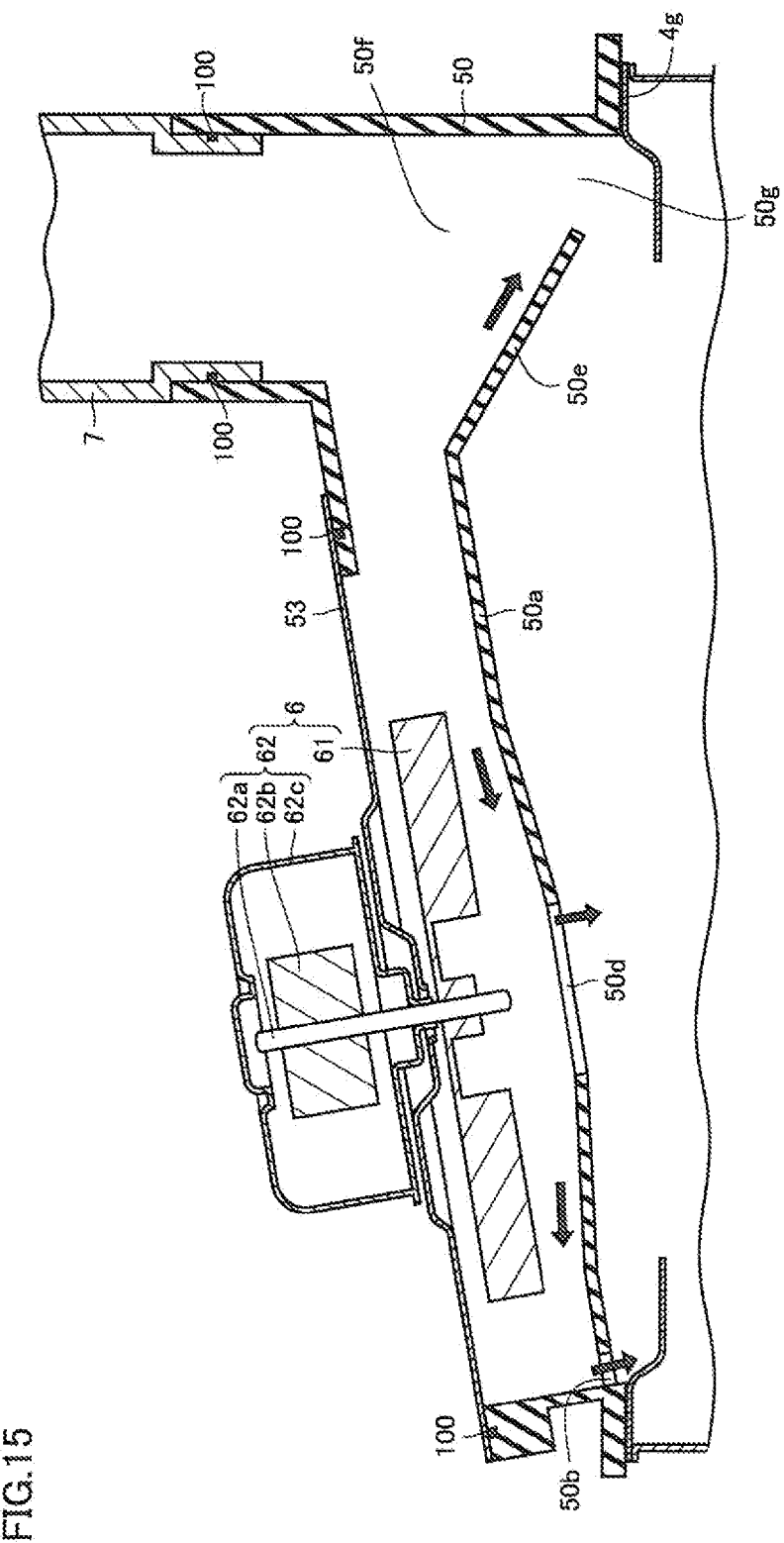
FIG. 15 is a partial cross-sectional view for illustrating the configuration of a fan and the like of a water heater in the fifth embodiment.

Integrated structure 50 shown in FIG. 15 is different from that in the fourth embodiment in the point that a drainage water collection chamber 50f for collecting drainage water and moisture having flowed backward from exhaust tube 7 is provided by bottom wall 50e, but this integrated structure 50 is similar in other points to that in the fourth embodiment.

It is preferable that bottom wall 50e of drainage water collection chamber 50f is inclined in the direction opposite to bottom wall 50a with respect to the above-described reference plane, and has a drainage water discharge port 50g leading to the exhaust box and located at the lowermost position in the vertical direction in the state where the water heater is placed.

In the present embodiment, even when drainage water and moisture (rainwater and the like) drip from exhaust tube 7, drainage water collection chamber 50f can prevent such drainage water and moisture from moving into the fan case (toward fan 6), so that deterioration of the impeller caused by the drainage water is suppressed. Furthermore, the drainage water and moisture are moved by gravity (as shown by black arrows in the figure) without being stirred up by the impeller, and then, moved through drainage water discharge port 50g into the exhaust box. Accordingly, there is an advantage that drainage water is further less likely to stay within the fan case.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater of a latent heat recovery type capable of heating water by recovering latent heat of combustion gas, said water heater comprising:
   a combustion apparatus including a burner that has a plurality of burner port portions and generating combustion gas from openings at ends of said plurality of burner port portions;
   a heat exchanger heating water flowing through inside by heat exchange with combustion gas generated in said combustion apparatus; and
   a fan suctioning combustion gas having passed through said heat exchanger and emitting combustion gas to outside of said water heater, said fan including a fan case, an impeller housed within said fan case so as to be rotatable, and a drive source provided outside said fan case and having a rotation shaft connected to said impeller, at least a part of an upper surface of a bottom wall of said fan case being inclined with respect to a reference plane including said openings of said plurality of burner port portions, said fan includes an inlet port through which combustion gas is suctioned, said inlet port is provided at a position in the bottom wall of said fan case that is closest to said heat exchanger in a direction perpendicular to the reference plane including said openings of said plurality of burner port portions, and at least a part of the upper surface of said bottom wall has an inclined portion that is inclined with respect to said reference plane so as to be closer to said heat exchanger as coming closer to said inlet port.

2. The water heater according to claim 1, wherein at least a portion of said upper surface of said bottom wall of said fan case that overlaps with said impeller as seen from a shaft direction of said rotation shaft entirely has an inclined portion that is inclined with respect to said reference plane so as to be closer to said heat exchanger as coming closer to said inlet port.

3. The water heater according to claim 1, wherein a shaft direction of said rotation shaft is perpendicular to said reference plane.

4. The water heater according to claim 1, further comprising an exhaust box between said fan and said heat exchanger for introducing combustion gas from said heat exchanger into said fan, wherein said heat exchanger has an upper wall that is partially opened to form a combustion gas exhaust port, and a flow path cross-sectional area in a cross section of said exhaust box that is parallel to said reference plane is larger than an opening area of said combustion gas exhaust port and an opening area of said inlet port.

5. The water heater according to claim 4, wherein said exhaust box further includes a deflection plate between said combustion gas exhaust port of said heat exchanger and said inlet port of said fan case so as to be spaced apart from said combustion gas exhaust port and said inlet port, and said deflection plate blocks a portion where at least said inlet port and said combustion gas exhaust port overlap with each other as seen from a direction of said rotation shaft.

6. The water heater according to claim 4, wherein said fan case has a first cylindrical portion formed of a circumferential wall protruding from a circumferential edge portion of said inlet port of said bottom wall toward said heat exchanger, said exhaust box has a ceiling wall having an opening and a second cylindrical portion formed of a circumferential wall protruding from a circumferential edge portion of said opening of said ceiling wall toward said fan case, said first cylindrical portion is fitted into said second cylindrical portion, and a seal member is interposed between an outer circumferential surface of said first cylindrical portion and an inner circumferential surface of said second cylindrical portion.

7. The water heater according to claim 4, wherein at least a part of said inlet port of said fan case does not overlap with said combustion gas exhaust port of said heat exchanger as seen from a direction of said rotation shaft.

8. The water heater according to claim 1, wherein said impeller is made of a resin material having acid resistance.

9. The water heater according to claim 1, wherein said reference plane is a horizontal plane in a state where said water heater is placed.

10. A water heater of a latent heat recovery type capable of heating water by recovering latent heat of combustion gas, said water heater comprising:

a combustion apparatus including a burner that has a plurality of burner port portions and generating combustion gas from openings at ends of said plurality of burner port portions;

a heat exchanger heating water flowing through inside by heat exchange with combustion gas generated in said combustion apparatus; and a fan suctioning combustion gas having passed through said heat exchanger and emitting combustion gas to outside of said water heater, said fan including a fan case, an impeller housed within said fan case so as to be rotatable, and a drive source provided outside said fan case and having a rotation shaft connected to said impeller, at least a part of an upper surface of a bottom wall of said fan case being inclined with respect to a reference plane including said openings of said plurality of burner port portions, at least a portion in the upper surface of the bottom wall of said fan case that is located on an outer circumferential side relative to said impeller is inclined with respect to said reference plane, and said rotation shaft is inclined with respect to a direction perpendicular to said reference plane.

11. The water heater according to claim 10, wherein said bottom wall of said fan case is provided with a drainage water discharge port at least at a lowermost position in a vertical direction in a state where said water heater is placed.

12. The water heater according to claim 10, further comprising an exhaust box between said fan and said heat exchanger for introducing combustion gas from said heat exchanger into said fan, wherein an upper wall of said exhaust box is inclined with respect to said reference plane, and said fan is fixed to said upper wall of said exhaust box such that said rotation shaft is inclined with respect to said reference plane.

13. The water heater according to claim 10, wherein said impeller is made of a resin material having acid resistance.

14. The water heater according to claim 10, wherein said reference plane is a horizontal plane in a state where said water heater is placed.

15. A water heater of a latent heat recovery type capable of heating water by recovering latent heat of combustion gas, said water heater comprising:

a combustion apparatus including a burner that has a plurality of burner port portions and generating combustion gas from openings at ends of said plurality of burner port portions;

a heat exchanger heating water flowing through inside by heat exchange with combustion gas generated in said combustion apparatus; and a fan suctioning combustion gas having passed through said heat exchanger and emitting combustion gas to outside of said water heater, said fan including a fan case, an impeller housed within said fan case so as to be rotatable, and a drive source provided outside said fan case and having a rotation shaft connected to said impeller, at least a part of an upper surface of a bottom wall of said fan case being inclined with respect to a reference plane including said openings of said plurality of burner port portions, at least a portion in the upper surface of the bottom wall of said fan case that is located on an outer circumferential side relative to said impeller is inclined with respect to said reference plane, said fan case is formed of a fan case main body including said bottom wall and a circumferential wall of said fan case, and a fan case lid including an upper wall of said fan case, and a seal member is disposed at a joint portion between said fan case main body and said fan case lid.

16. A water heater of a latent heat recovery type capable of heating water by recovering latent heat of combustion gas, said water heater comprising:

a combustion apparatus including a burner that has a plurality of burner port portions and generating combustion gas from openings at ends of said plurality of burner port portions;

a heat exchanger heating water flowing through inside by heat exchange with combustion gas generated in said combustion apparatus; and a fan suctioning combustion gas having passed through said heat exchanger and emitting combustion gas to outside of said water heater;

said fan including a fan case, an impeller housed within said fan case so as to be rotatable, and a drive source provided outside said fan case and having a rotation shaft connected to said impeller, at least a part of an upper surface of a bottom wall of said fan case being inclined with respect to a reference plane including said openings of said plurality of burner port portions, and at least a portion in the upper surface of the bottom wall of said fan case that is located on an outer circumferential side relative to said impeller is inclined with respect to said reference plane, said water heater further comprises an exhaust joint for connecting said fan case and an exhaust tube leading to the outside of said water heater, and said exhaust joint has an opening in a portion connected to said exhaust tube, and said opening is located so as not to overlap with said impeller as seen from a direction perpendicular to said reference plane.

17. A water heater of a latent heat recovery type capable of heating water by recovering latent heat of combustion gas, said water heater comprising:

a combustion apparatus including a burner that has a plurality of burner port portions and generating combustion gas from openings at ends of said plurality of burner port portions;

a heat exchanger heating water flowing through inside by heat exchange with combustion gas generated in said combustion apparatus; and a fan suctioning combustion gas having passed through said heat exchanger and emitting combustion gas to outside of said water heater, said fan including a fan case, an impeller housed within said fan case so as to be rotatable, and a drive source provided outside said fan case and having a rotation shaft connected to said impeller, at least a part of an upper surface of a bottom wall of said fan case being inclined with respect to a reference plane including said openings of said plurality of burner port portions, at least a portion in the upper surface of the bottom wall of said fan case that is located on an outer circumferential side relative to said impeller is inclined with respect to said reference plane, and said fan case is formed of a fan case main body including said bottom wall and a circumferential wall of said fan case, and a fan case lid including an upper wall of said fan case, said water heater further comprises:

an exhaust box between said fan and said heat exchanger for introducing combustion gas from said heat exchanger into said fan; and an exhaust joint for connecting said fan case and an exhaust tube leading to the outside of said water heater, and at least said fan case main body, said exhaust box, and said exhaust joint are formed of an integrated structure.

18. The water heater according to claim 17, wherein said integrated structure includes a drainage water collection chamber collecting drainage water and moisture that have flowed backward from said exhaust tube, and a bottom wall of said drainage water collection chamber is inclined with respect to said reference plane, and has a drainage water discharge port leading to said exhaust box and located at a lowermost position in a vertical direction in a state where said water heater is placed.

* * * * *